US 12,287,219 B2

United States Patent
Wang

(10) Patent No.: US 12,287,219 B2
(45) Date of Patent: Apr. 29, 2025

(54) NAVIGATION PROCESSING METHOD AND APPARATUS, SERVICE SIDE DEVICE, INTELLIGENT TERMINAL, AND STORAGE MEDIUM

(71) Applicant: TENCENT TECHNOLOGY (SHENZHEN) COMPANY LIMITED, Shenzhen (CN)

(72) Inventor: Jian Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 256 days.

(21) Appl. No.: 17/982,262

(22) Filed: Nov. 7, 2022

(65) Prior Publication Data

US 2023/0058261 A1 Feb. 23, 2023

Related U.S. Application Data

(63) Continuation of application No. PCT/CN2021/128094, filed on Nov. 2, 2021.

(30) Foreign Application Priority Data

Nov. 26, 2020 (CN) .......................... 202011348989.7

(51) Int. Cl.
*G01C 21/36* (2006.01)
*G01C 21/00* (2006.01)
*G06F 3/04883* (2022.01)

(52) U.S. Cl.
CPC ..... *G01C 21/3614* (2013.01); *G01C 21/3885* (2020.08); *G06F 3/04883* (2013.01)

(58) Field of Classification Search
CPC ...... G01C 21/005; G01C 21/20; G01C 21/28; G01C 21/30; G01C 21/34; G01C 21/3415;
(Continued)

(56) References Cited

U.S. PATENT DOCUMENTS

| 2014/0074401 A1* | 3/2014 | Otani | G01C 21/3664 |
| | | | 701/533 |
| 2015/0338974 A1* | 11/2015 | Stone | G06F 3/0481 |
| | | | 345/173 |
| 2022/0291005 A1* | 9/2022 | Ye | G01C 21/3492 |

FOREIGN PATENT DOCUMENTS

| CN | 103791912 A | 5/2014 |
| CN | 104677369 A | 6/2015 |
| CN | 106382929 A | 2/2017 |
| CN | 106643774 A | 5/2017 |

(Continued)

OTHER PUBLICATIONS

English translation of CN 110793533 (Year: 2020).*

(Continued)

*Primary Examiner* — Russell Frejd
*Assistant Examiner* — Brandon Z Willis
(74) *Attorney, Agent, or Firm* — ANOVA LAW GROUP, PLLC

(57) ABSTRACT

This application discloses a navigation processing method and apparatus, a server, and an intelligent terminal. The method includes obtaining drawn route information, the drawn route information comprising N initial location points confirmed according to an electronic map, the N initial location points being determined according to a trajectory drawn based on a sliding operation on an interactive interface where the electronic map is displayed, and N being a positive integer; matching the N initial location points with road network information to obtain associated road information, the associated road information comprising M associated location points and L associated links, and M and L being positive integers; obtaining a location similarity between the N initial location points and the M associated location points; and determining a target navigation route (Continued)

corresponding to the drawn route information according to the L associated links when the location similarity meets a navigation condition.

18 Claims, 12 Drawing Sheets

(58) Field of Classification Search
CPC ............ G01C 21/3407; G01C 21/3446; G01C 21/3484; G01C 21/3614; G01C 21/362; G01C 21/3664; G01C 21/367; G01C 21/3885; G06F 3/0488; G06F 3/04883; G06F 3/04845; G06F 16/26; G06F 16/29; G06F 2203/04806; G06F 2203/04114
See application file for complete search history.

(56) References Cited

FOREIGN PATENT DOCUMENTS

| CN | 106803402 | A | | 6/2017 | |
|---|---|---|---|---|---|
| CN | 107014391 | A | | 8/2017 | |
| CN | 110793533 | A | * | 2/2020 | ......... G01C 21/3476 |
| CN | 111896023 | A | * | 11/2020 | ......... G01C 21/3407 |
| CN | 112328151 | A | | 2/2021 | |

OTHER PUBLICATIONS

English translation of CN 111896023 (Year: 2020).*
The World Intellectual Property Organization (WIPO) International Search Report for PCT/CN2021/128094 Jan. 20, 2022 7 Pages (including translation).

* cited by examiner

NAVIGATION PROCESSING METHOD AND APPARATUS, SERVICE SIDE DEVICE, INTELLIGENT TERMINAL, AND STORAGE MEDIUM

RELATED APPLICATIONS

This application is a continuation application of PCT Application No. PCT/CN2021/128094, filed on Nov. 2, 2021, which in turn claims priority to Chinese Patent Application No. 202011348989.7, entitled "NAVIGATION PROCESSING METHOD AND APPARATUS, SERVICE SIDE DEVICE, INTELLIGENT TERMINAL, AND STORAGE MEDIUM" and filed with the China National Intellectual Property Administration on Nov. 26, 2020. The two applications are incorporated herein by reference in their entirety.

FIELD OF THE TECHNOLOGY

This application relates to the field of computer technologies, and in particular, to a navigation processing method and apparatus, a service side device, an intelligent terminal, and a storage medium.

BACKGROUND OF THE DISCLOSURE

The use of electronic maps for navigation provides great convenience for traveling. Whether a user is walking or driving, the navigation map can plan the route to the destination according to the current location of the user or the location specified by the user, so that the user can walk or drive to the destination according to the navigation route.

Navigation method mainly often plans the navigation route according to a start address and a destination, which is specifically embodied in planning the navigation route according to the start address (inputted address or current location) and the destination. This type of navigation application (APP) is limited by the existing data and navigation algorithm of the electronic map and some navigation planning defects exist. For example, when a user needs to pass through several intermediate points in succession and then reach the destination, the user needs to input the location names of multiple intermediate points in the waypoint text input box, but sometimes some intermediate points may fail to be retrieved by the electronic map, or it is impossible to input the location names. In such cases, it is not only time-consuming, but also impossible to plan the navigation route through these intermediate points.

SUMMARY

Embodiments of this application provide a navigation processing method and apparatus, a device, and a storage medium, so that a target navigation route can be obtained according to a trajectory drawn based on a sliding operation.

One aspect of this application provides a navigation processing method, performed by a service side device. The method includes obtaining drawn route information, the drawn route information comprising N initial location points confirmed according to an electronic map, the N initial location points being determined according to a trajectory drawn based on a sliding operation on an interactive interface where the electronic map is displayed, and N being a positive integer; matching the N initial location points with road network information to obtain associated road information, the associated road information comprising M associated location points and L associated links, and M and L being positive integers; obtaining a location similarity between the N initial location points and the M associated location points; and determining a target navigation route corresponding to the drawn route information according to the L associated links when the location similarity meets a navigation condition.

Another aspect of this application provides a navigation processing method, performed by an intelligent terminal. The method includes displaying an interactive interface comprising an electronic map; receiving a sliding operation on the interactive interface, and determining a trajectory drawn on the electronic map according to the sliding operation; determining N initial location points according to a location of the drawn trajectory on the electronic map; transmitting a navigation request carrying the N initial location points to a service side device, the navigation request being used for requesting the service side device to perform navigation processing according to the N initial location points; and receiving a target navigation route returned by the service side device.

Correspondingly, an embodiment of this application provides a non-transitory computer storage medium, storing a computer program, the computer program being executed by a processor to implement the foregoing navigation processing method.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

The following clearly and completely describes the technical solutions in the embodiments of this application with reference to the accompanying drawings in the embodiments of this application. Apparently, the described embodiments are merely some but not all of the embodiments of this application. All other embodiments obtained by a person of ordinary skill in the art based on the embodiments of this application without creative efforts fall within the protection scope of this application.

The embodiments of this application mainly provide a navigation processing solution for a user, so that a sliding operation of the user can be received on an interactive interface where an electronic map is displayed, and then from a trajectory drawn based on the sliding operation of the user, one or more target navigation routes can be obtained through processing logic such as road network matching and location similarity calculation. Accordingly, the user can conveniently obtain the target navigation routes according to demand (such as the waypoint demand or the shortcut demand) of the user, and the flexibility of navigation route configuration can be ensured. Moreover, for the same start address and destination, if the trajectories drawn based on the sliding operations initiated by the user are different, the final target navigation routes can vary, further improving the flexibility of route planning.

Figure 1:
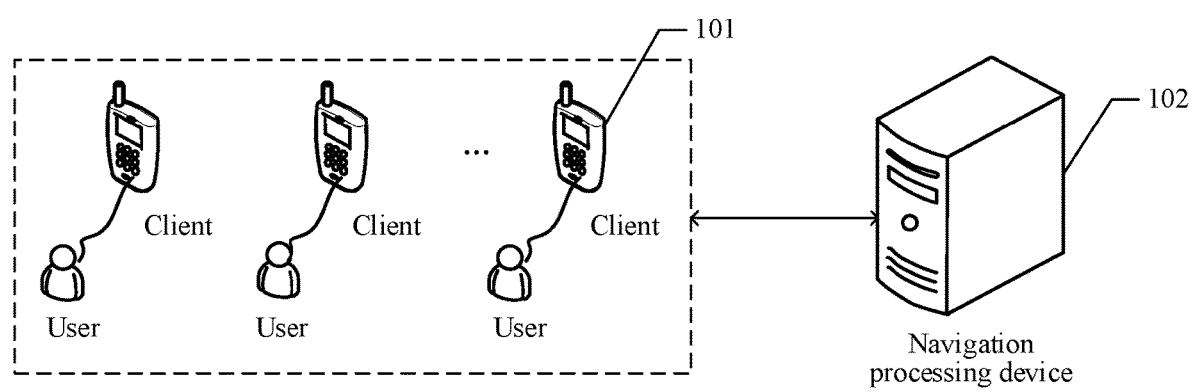
FIG. 1 is a schematic structural diagram of a navigation processing system according to an embodiment of this application.

Based on the navigation processing solution briefly described above, an embodiment of this application provides a navigation processing system. FIG. 1 is a schematic structural diagram of a navigation processing system according to an embodiment of this application. The navigation processing system shown in FIG. 1 may include an intelligent terminal 101 and a service side device 102. The intelligent terminal 101 may be installed with a navigation APP or a mini program with a navigation function, and navigation processing is mainly performed by the service side device 102. In some embodiments, if the intelligent terminal 101 has strong software and hardware performance, the navigation processing method involved in this application can be implemented on the intelligent terminal 101.

The intelligent terminal 101 may refer to a terminal with a network communication function and a touch display function, such as a smartphone, a tablet computer, a notebook computer, a desktop computer, a smart speaker, or a smart watch. The service side device 102 may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform.

The intelligent terminal 101 is provided with a navigation APP, and the intelligent terminal 101 has a touch screen. Through the navigation APP, a sliding operation of a user on the touch screen is obtained and then drawn route information is obtained. For an electronic map displayed on an interactive interface of the navigation APP, N initial location points can be obtained according to the drawn route information on the electronic map. The intelligent terminal 101 may transmit the drawn route information to the service side device 102. After obtaining the drawn route information, the service side device 102 matches the included N initial location points with road network information to obtain associated road information including M associated location points and L associated links. The service side device 102 further obtains a location similarity between the N initial location points and the M associated location points. If the location similarity meets a navigation condition, for example, a distance between most of the N initial location points and one or more associated location points is within a preset distance threshold, the service side device 102 considers that the matching is successful and the navigation condition is met. In this case, a target navigation route corresponding to the drawn route information can be determined according to the L associated links. The service side device 102 can directly transmit the target navigation route to the intelligent terminal 101. After receiving the target navigation route, the intelligent terminal 101 can display the target navigation route. If the user needs to follow the target navigation route, the user can tap a Start Navigation button to start navigation for the user according to the target navigation route. M, N, and L are all positive integers.

Figure 2:
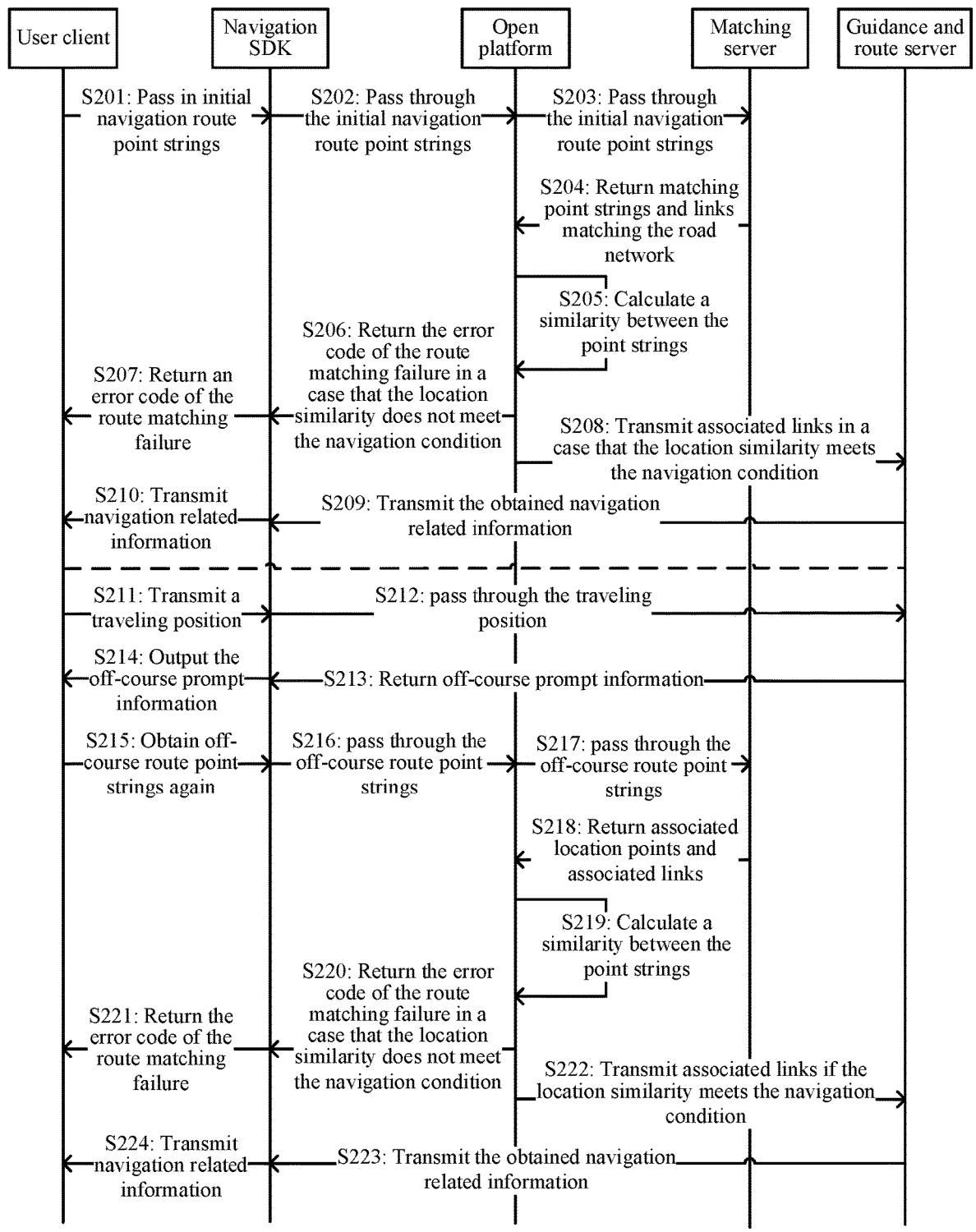
FIG. 2 is a schematic interactive flowchart of a navigation method according to an embodiment of this application.

FIG. 2 is a schematic flowchart of a navigation method according to an embodiment of this application. Navigation route determination and off-course navigation processing are implemented through interaction between a user client, a navigation SDK, and a service side device. In an embodiment, the navigation SDK (software development kit) is a toolkit for implementing navigation functions, and encapsulates navigation related functions, such as route planning and navigation given start and end points. The service side device includes a server named an open platform, an matching server for matching location points, and a guidance and route server that provides guidance information and route information. In some embodiments, the network side device may also be implemented by a server. The navigation method in one embodiment includes the following steps.

S201: A user client passes in initial navigation route point strings. The initial navigation route point strings correspond to drawn route information, N initial location points confirmed according to an electronic map included in the drawn route information are the initial navigation route point strings, and the initial navigation route point strings are determined according to a trajectory drawn based on a sliding operation on an interactive interface where the electronic map is displayed.

S202: The navigation SDK passes through the initial navigation route point strings to the open platform of the service side device. The navigation SDK can transmit the initial navigation route point strings to the open platform through a mobile communication network and a computer network.

S203: The open platform passes through the initial navigation route point strings to the matching server. The open platform and the matching server can be connected by wire, to transmit data through the computer network.

S204: The matching server performs road network matching and returns matching point strings and links matching the road network to the open platform. The matching server mainly matches the initial navigation route point strings or the N initial location points with road network information to obtain associated road information, where the associated road information includes M associated location points (matching point strings) and L associated links. The road network information is road data information, including a road shape and a location of a road, the link is the smallest unit in the road network information, and the road is composed of links. Generally, a length of the link is between ten meters and tens of meters for roads in cities. In a map navigation service, roads are generally divided into links, and a link is uniquely identified in the road network information by a link identifier LinkID.

S205: After receiving the associated road information returned by the matching server, the open platform calculates a similarity between the point strings, that is, the open platform calculates and obtains a location similarity between the N initial location points and the M associated location points. The method of calculating the similarity is mainly to calculate the distance between the location points, and the calculation of the location similarity will be described in detail in the following embodiments.

S206: When the location similarity does not meet the navigation condition, for example, when the similarity is less than a similarity threshold, the open platform returns an error code of the navigation route matching failure to the navigation SDK.

S207: The navigation SDK returns the error code of the route matching failure to the user client. The user client reminds the user by displaying a prompt box or a voice prompt, for example, displaying a prompt that the drawn route navigation fails in a prompt box, or a voice prompt "the drawn route navigation fails, please try again".

S208: When the location similarity meets the navigation condition, the open platform transmits the associated links to the guidance and route server, and the guidance and route server determines a target navigation route corresponding to the drawn route information according to the L associated links. At the same time, the guidance and route server can further determine guidance information, estimated time of arrival (ETA), road condition, and the like according to the links.

The guidance information refers to notification messages given by a navigation APP during the navigation process, for example, turn left 50 m ahead, sharp turn ahead, and please drive carefully, which are related to the route. Specific message notifications are triggered at a specific time and location. The ETA may be the estimated arrival time for the user, and the road condition reminds the user of a congestion degree of road sections corresponding to the links.

In one embodiment, the guidance and route server may transmit the target navigation route to the navigation SDK, and the navigation SDK reminds the user on the user client. When the user confirms to navigate with the target navigation route, the guidance and route server receives a navigation trigger instruction for navigation based on the target navigation route, obtains route information corresponding to the target navigation route from the road network information, obtains guidance information corresponding to the target navigation route according to associated links corresponding to the target navigation route, and performs navigation processing according to the route information corresponding to the target navigation route and the guidance information corresponding to the target navigation route.

S209: The guidance and route server directly transmits the obtained navigation related information, such as guidance information, ETA, road condition, and target navigation route, to the navigation SDK.

S210: Based on the navigation related information received from the guidance and route server, the navigation SDK displays the navigation related information on the user client, or reminds the navigation related information by voice or other manners.

The above S201 to S210 describe the navigation process, and the off-course process is further described below.

S211: The user client obtains a traveling location in real time or at short intervals during the process of moving with the user's walking or the user's vehicle, and inputs each traveling location into the navigation SDK.

S212: The navigation SDK passes on each traveling location to the guidance and route server, and the guidance and route server determines whether the user client is off course. Off course refers to that in the navigation process, if several consecutive points cannot be mapped or fitted to the current route, it is considered that off course occurs, and in this case, a latest positioning point is taken as a start point and an original end point is taken as an end point, to re-initiate route planning and continue navigation.

S213: If the guidance and route server determines that the user client is off course, the guidance and route server returns off-course prompt information to the navigation SDK. In an embodiment, the off-course prompt information includes: prompt information for prompting to re-slide to draw on the interactive interface where the electronic map is displayed.

S214: The navigation SDK further outputs the off-course prompt information at the user client to remind the user that the trajectory for navigation can be redrawn, or plans the navigation route according to the current traveling location and the end location point of the target navigation route according to the default navigation planning rules.

S215: If the user client receives the trajectory for navigation redrawn on the interactive interface including the electronic map and displayed on the client by the user, the user client obtains off-course route point strings again and transmits the off-course route point strings to the navigation SDK, and the off-course route point strings can actually be considered as the N initial location points corresponding to the drawn route information this time.

S216: The navigation SDK passes through the off-course route point strings to the open platform.

S217: The open platform passes through the off-course route point strings to the matching server, so that the matching server returns the associated location points and associated links that match the off-course route point strings.

S218: The matching server performs road network matching, and returns the associated location points and associated links that match the off-course route point strings to the open platform.

S219: After receiving the associated road information returned by the matching server, the open platform calculates a similarity between the point strings, that is, a location similarity between the off-course route point strings and their corresponding associated location point strings, to determine whether navigation can be performed according to manually drawn route information.

S220: When the location similarity does not meet the navigation condition, for example, when the similarity is less than a similarity threshold, the open platform returns an error code of the navigation route matching failure to the navigation SDK.

S221: The navigation SDK returns the error code of the route matching failure to the user client. The user client reminds the user by displaying a prompt box or a voice prompt, for example, displaying a prompt that the drawn route navigation fails in a prompt box, or a voice prompt "the drawn route navigation fails, please try again".

S222: When the location similarity meets the navigation condition, the open platform transmits the associated links to the guidance and route server, and the guidance and route server determines the target navigation route corresponding to the drawn route information according to the L associated links. At the same time, the guidance and route server can further determine guidance information, ETA, road condition, and the like according to the links.

S223: The guidance and route server directly transmits the obtained navigation related information, such as guidance information, ETA, road condition, and target navigation route, to the navigation SDK.

S224: Based on the navigation related information received from the guidance and route server, the navigation SDK displays the navigation related information on the user client, or reminds the navigation related information by voice or other manners.

As can be seen from the above process, first, the user manually draws the route on the APP, the data is transferred to the navigation SDK, the navigation SDK transmits the request to the open platform, and then the open platform requests the matching server to bind the route. In this case, road network matching is performed on longitude and latitude point strings corresponding to the drawn route information corresponding to the manually drawn trajectory. If the matching is successful, the matched longitude and latitude point strings and link strings (multiple consecutive longitude and latitude points are on the same link) and a distance array of points before and after the matching (that is, distances between each bound point and the original points) are returned. Then, the open platform calculates a similarity between the original drawn routes and the matched routes, and if the similarity exceeds a threshold (for example, 90%), the matched link strings are used as a request parameter to request route information and guidance information, and the open platform receives the combination of the two types of information data, and then returns the data to the navigation SDK for navigation.

It can be seen from the interactive process that, the processing flow of off course in the navigation process herein may be redrawing the route by the user or automatically navigating according to the off-course recommended route to avoid the operation of the user during driving and improve safety. Therefore, the user redrawing herein is an optional operation.

If it is found during this process that a similarity between the automatically matched route and the original manually drawn route of the user is less than a threshold (for example, 90%), the service side can prompt the user that the automatic route generation fails by pop-up notification on the page and request the user to redraw, or the APP is responsible for using the recommended route of route planning for navigation when the similarity is less than the threshold. These are all customizable designs on the service side.

Figure 3:
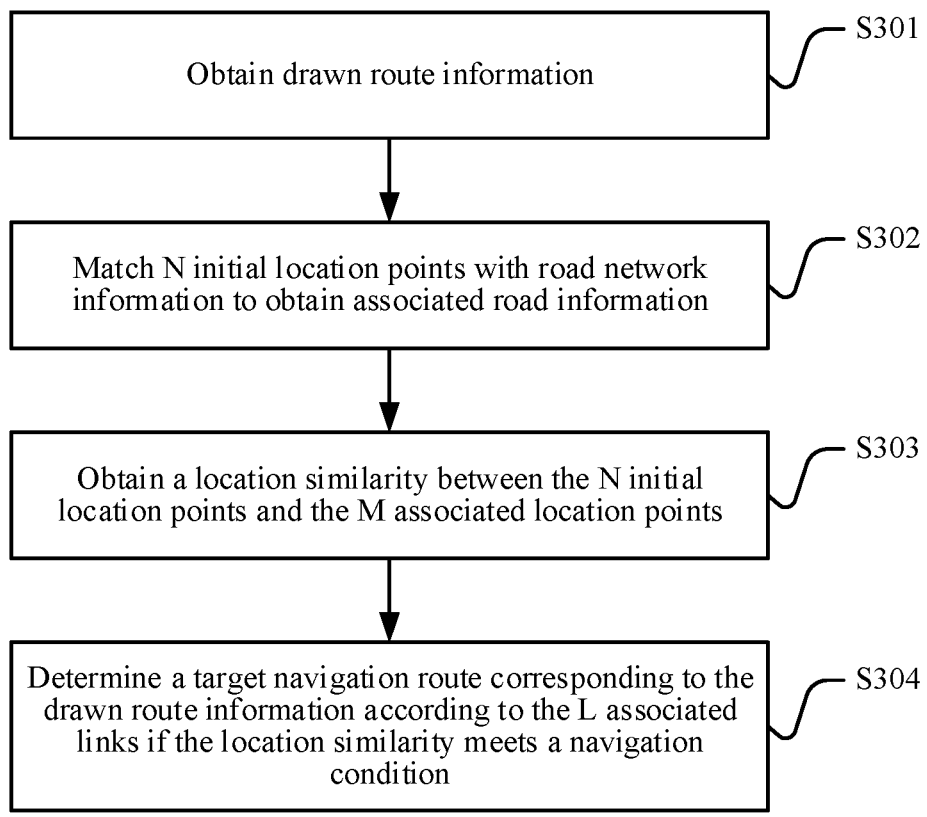
FIG. 3 is a schematic flowchart of a navigation processing method according to an embodiment of this application.

Based on the above navigation processing system and navigation processing solution, an embodiment of this application provides a navigation processing method. FIG. 3 is a schematic flowchart of a navigation processing method according to an embodiment of this application. The navigation processing method shown in FIG. 3 may be performed by the service side device. It can be understood that some intelligent terminals with powerful software and hardware performance can also be used to perform the navigation processing method shown in FIG. 3. The navigation processing method shown in FIG. 3 may include the following steps.

S301: Obtain drawn route information, the drawn route information including N initial location points confirmed according to an electronic map. The N initial location points are determined according to a trajectory drawn based on a sliding operation on an interactive interface where the electronic map is displayed. In an embodiment, each initial location point may refer to a latitude and longitude coordinate point obtained according to a location of the corresponding initial location point on the electronic map.

The interactive interface where the electronic map is displayed can be displayed to a user on an intelligent terminal, and the user can operate a corresponding navigation APP through the interactive interface and select a function mode of manually drawing a navigation route. In this function mode, the navigation APP displays part of a map region on the interactive interface, and a sliding operation of the user in the part of the map region of the interactive interface, such as touching and moving with one finger on the interactive interface, can generate a sliding trajectory, and the drawn route information can be obtained based on the sliding trajectory and the interactive interface.

The part of the map region can be selected by other user operations different from the sliding operation. For example, a local region in the part of the map region is zoomed in by the sliding operation with two fingers away from each other, part of a map region of a larger region is displayed by the sliding operation with two fingers from far to near, and the part of the map region is moved up, down, left and right by a tap operation greater than a pressure threshold and then sliding.

In addition, on the electronic map, the drawn route information is composed of a plurality of location points on the electronic map, and the N initial location points are some or all of the location points.

If the user does not select to draw the navigation route manually, the navigation APP uses a default description to display the electronic map on the interactive interface. If the user slides left and right on the interactive interface where the electronic map is located, a map display region on the interactive interface is moved left and right, and if the user slides up and down on the interactive interface where the electronic map is located, a map display region on the interactive interface is moved up and down without any trajectory.

For the service side device, the obtaining drawn route information may include: receiving the drawn route information transmitted by an intelligent terminal, where the N initial location points included in the drawn route information are determined by the intelligent terminal according to a trajectory drawn based on a sliding operation on an interactive interface where the electronic map is displayed.

Figure 4A:
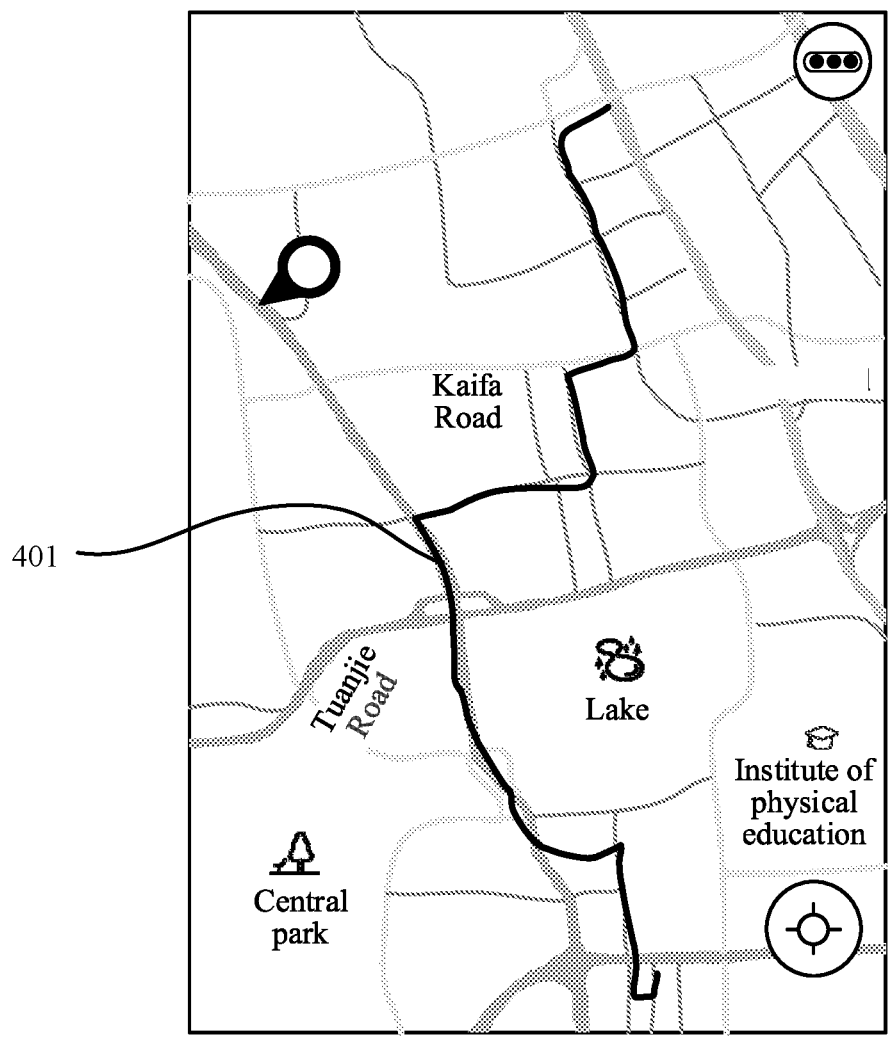
FIG. 4a is a schematic diagram of a trajectory manually drawn on an electronic map according to an embodiment of this application.

In an embodiment, FIG. 4a is a schematic diagram of a trajectory manually drawn on an electronic map according to an embodiment of this application. The drawn trajectory is a line 401 in FIG. 4a. A user can draw the trajectory as required, including location points to be passed, and location points and road sections on some shortcuts known by the user, so as to automatically generate a target navigation route 402 shown in FIG. 4b, and guidance information. Information such as ETA and road condition can be displayed on the navigation interface.

Figure 4B:
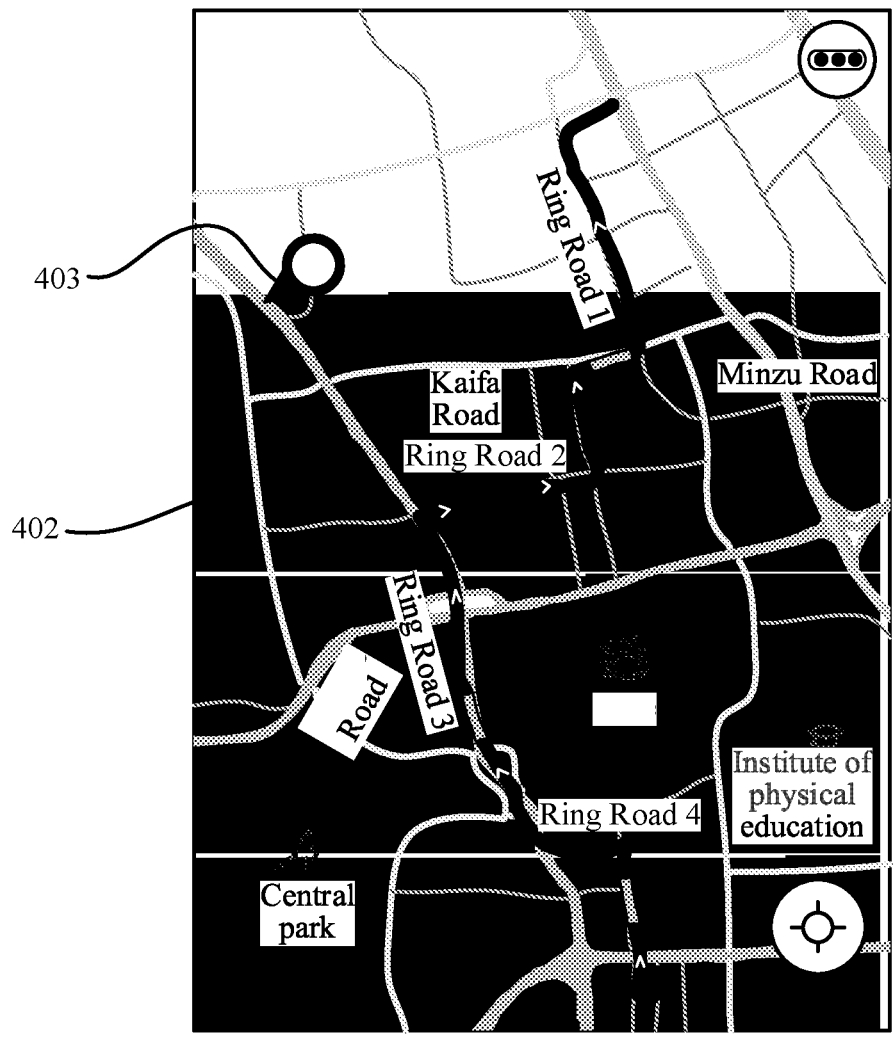
FIG. 4b is a schematic diagram of navigation routes on an electronic map according to an embodiment of this application.

Moreover, as shown in FIG. 4a and FIG. 4b, a current location of the user may not be a start point, nor an end point or an intermediate point, and a current location point of the user (the location point 403 in the figure) has no relationship with the target navigation route 402, which reflects the flexibility of this application for navigation route planning and configuration with few constraints.

In an embodiment of this application, the drawn trajectory has a sequence, and the sequence determines start and end locations required for this navigation, and a traveling direction of a navigation route. In some embodiments, after the map is drawn, an interactive identifier can also be displayed on the interactive interface, where the interactive identifier is used for prompting the user to set a point on the drawn trajectory as a start point and another point on the drawn trajectory as an end point. Based on an operation of the user on the interactive identifier, the start point and the end point of the drawn trajectory can be obtained, and N initial location points with a sequence can be obtained.

S302: Match the N initial location points with road network information to obtain associated road information, the associated road information including M associated location points and L associated links.

The road network information may include road data information, such as a road location, a road length, a road shape, and a link. The link is the smallest unit in the road network information, and the road is composed of links.

In an embodiment, S302 may include: matching the N initial location points with location points on roads included in the road network information; obtaining the M associated location points on an associated road that matches the N initial location points when the matching is successful; and determining the L associated links according to the M associated location points. Various location points mentioned in one embodiment may all correspond to GPS coordinates, and one corresponding location point refers to one GPS coordinate.

Due to a positioning problem, a trajectory obtained by original drawing has problems such as jump and deviation of trajectory points. Therefore, it is necessary to call a road binding service for the N initial location points included in the obtained drawn route information, and the road binding service can be obtained through an external road binding service (snapstoroads) provided by some location service open platforms. The service returns coordinate strings matched to the road after denoising and smoothing processing according to point string coordinates that are passed in, such as a vehicle traveling trajectory, to correct the initial location points corresponding to the trajectory. The specific effects are shown in FIG. 5a and FIG. 5b.

Figure 5A:
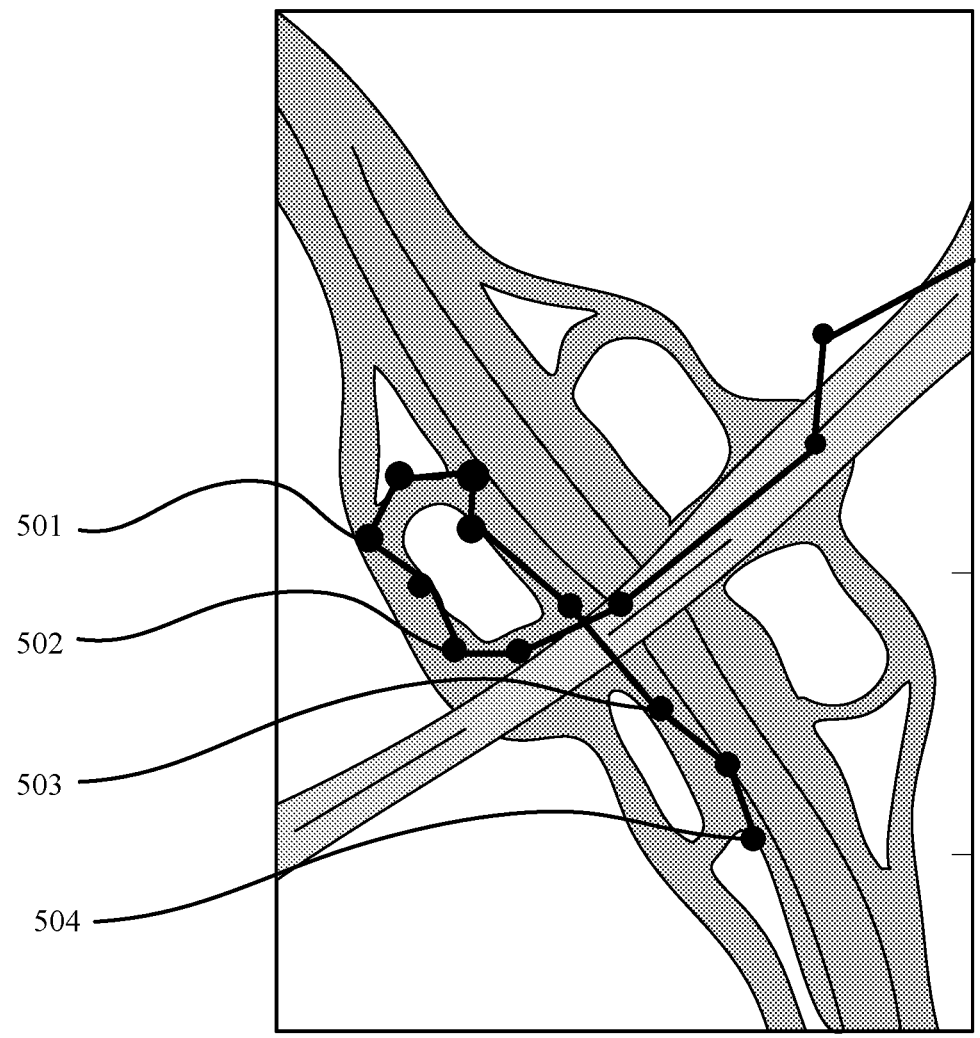
FIG. 5a is a schematic diagram of initial location points according to an embodiment of this application.
Figure 5B:
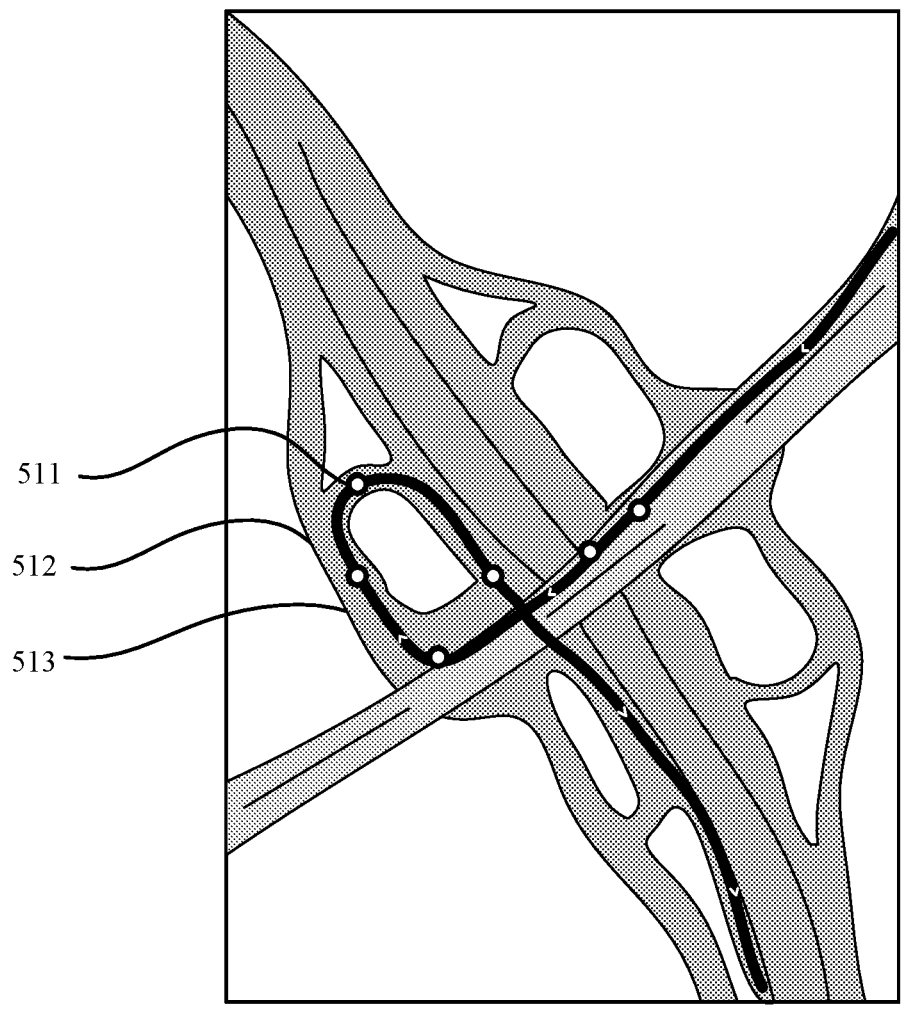
FIG. 5b is a schematic diagram of associated location points according to an embodiment of this application.

In FIG. 5a, dots such as a dot 501, a dot 502, a dot 503, and a dot 504 refer to the initial location points, and the associated road information obtained after the road binding processing is performed through the road binding service or the N initial location points are matched with the road network information is shown in FIG. 5b and includes M associated location points, such as a hollow dot 511, a hollow dot 512, and a hollow dot 513 in FIG. 5b.

After the associated location points are confirmed for the initial location points, a mapping relationship of the initial location points to links can be established. In this case, corresponding link information can be found through latitude and longitude of the associated location points corresponding to the initial location points, and the links can be obtained through a service provided by a platform that provides a link information query service. The service returns a link identifier LinkID and related attributes of the road where the location corresponding to latitude and longitude coordinates is located according to the passed-in latitude and longitude coordinates. By calling this service for the associated location points corresponding to the initial location, the mapping relationship between trajectory points and the links can be established, as shown in FIG. 5b, and the obtained links include Link511, Link512, and the like. Through S302, the matched M associated location points, the associated link strings and a distance array of the matched points can be returned. The distance array mainly records: distance values between each of the N initial location points and its corresponding associated location points.

As described above, if the matching is successful, M associated location points and L associated links can be obtained, and if the matching fails, prompt information for indicating the navigation matching failure can be outputted, a start location point and an end location point can be determined from the N initial location points included in the drawn route information, and a planned navigation route can be generated according to the start location point and the end location point.

In one embodiment, if a manually drawn trajectory fails to generate a target navigation route, existing data in a navigation APP and a navigation planning strategy can be adopted to determine a planned navigation route to the user, so that the navigation function provides at least one available navigation route.

It can be understood that the start location point and the end location point are not a start point and an end point of the drawn route information in the strict sense. For example, since the thickness of a drawing object (such as a finger) used for drawing is not consistent, the start point of the trajectory drawn on the electronic map may be on a building, but using a roof of the building as a navigation start location is obviously inappropriate. Therefore, the start location point and the end location point are determined according to initial location points that meet the condition in the drawn route information, and the initial location points that meet the condition are determined according to a type of navigation demand. If it is a type of walking demand, the start location point is determined according to a location point closest to the trajectory start point but suitable for walking in the N initial location points; and if it is a type of driving demand, the start location point is determined according to a location point closest to the trajectory start point but suitable for the vehicle to travel in the N initial location points.

S303: Obtain a location similarity between the N initial location points and the M associated location points.

The location similarity is mainly determined based on a distance between the location points. If the distance is less than a threshold, it is considered that the two location points are similar; otherwise, it is considered that the two location points are not similar.

In an embodiment, the obtaining a location similarity between the N initial location points and the M associated location points includes: determining K similar location points from the M associated location points according to location coordinates of the N initial location points and location coordinates of the M associated location points, where distances between the K similar location points and at least one of the N initial location points are less than a distance threshold; and determining a ratio of K to N as the location similarity between the N initial location points and the M associated location points. K is a positive integer less than or equal to M.

Figure 6:
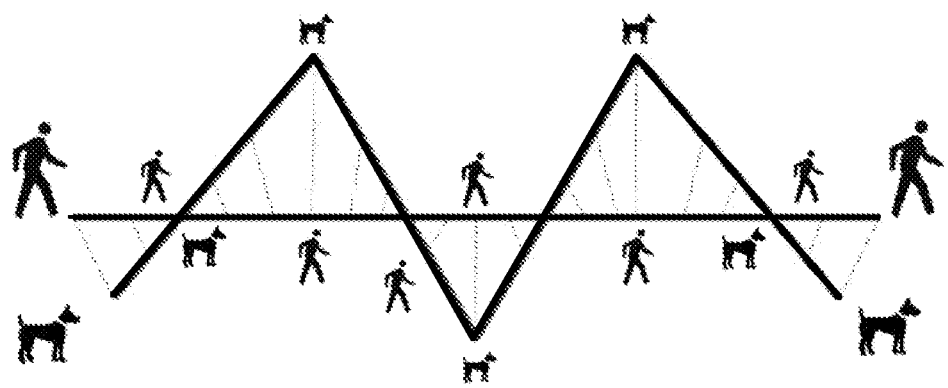
FIG. 6 is a schematic diagram of calculating a location similarity according to an embodiment of this application.

FIG. 6 is a schematic diagram of calculating a location similarity between location points according to an embodiment of this application. Location points where 8 people are located in FIG. 6 can be understood as N=8 initial location points, and location coordinates of the initial location points are as follows: X1, X2, X3, X4, X5, X6, X7, and X8. If 7 dog locations are obtained, it can be understood that M=7 associated location points, and the location coordinates of the associated location points are: Y1, Y1, Y3, Y4, Y5, Y6, and Y7. In one embodiment, it is assumed that the distance threshold is 150 m.

First, for X1, similar location points are determined from the 7 associated location points, that is, associated location points with a distance less than 150 m from X1 are first obtained from the 7 associated location points, and the associated location points with the distance less than 150 m are determined as the similar location points. For example, if the distances between Y1, Y2 and X1 are less than 150 m, Y1 and Y2 are determined as the similar location points.

Then, for X2, similar location points are determined from the 7 associated location points, that is, associated location points with a distance less than 150 m from X2 are first obtained from the 7 associated location points, and the associated location points with the distance less than 150 m are determined as the similar location points. For example, if the distance between Y3, Y4 and X2 is less than 150 m, Y3 and Y4 are determined as the similar location points.

The above steps are repeated until the 8 initial location points are traversed, to obtain similar location points corresponding to the 8 initial location points. Assuming that the number of similar location points is determined as K=5, the location similarity between the 8 initial location points and the 7 associated location points is: 5/8=62.5%, which is less than the similarity threshold 80%, and it can be considered that the matching the N initial location points with location points on roads included in the road network information fails. If the number of similar location points is determined as K=7, the location similarity between the 8 initial location points and the 7 associated location points is: 7/8=87.5%, which is greater than the similarity threshold 80%, and it can be considered that the matching the N initial location points with location points on roads included in the road network information is successful.

S304: Determine a target navigation route corresponding to the drawn route information according to L associated links when the location similarity meets a navigation condition.

After the target navigation route is determined, the target navigation route can be displayed to the user on the user client, and the user can be provided with a selection operation. If the selection operation is selecting start navigation, information such as guidance information, ETA, and road condition can be further obtained, to start navigation. In some embodiments, the user can also obtain the information such as guidance information, ETA, and road condition without selecting the start navigation, so that the user can be aware of the information such as road condition and ETA on the road route.

Therefore, in an embodiment, the method may further include: obtaining route information corresponding to the target navigation route from the road network information when a navigation trigger instruction for navigation based on the target navigation route is received; obtaining guidance information corresponding to the target navigation route according to associated links corresponding to the target navigation route; and performing navigation processing according to the route information corresponding to the target navigation route and the guidance information corresponding to the target navigation route.

According to one embodiment, on one hand, navigation errors in the navigation APP can be avoided. On the other hand, when the user is manually drawing a route, one or more intermediate points that are intended to pass through are included in the drawn route, so as to ensure that the finally calculated navigation route passes through these intermediate points, or routes that include these shortcut sections are drawn, to reach the destination more quickly, thereby greatly improving the flexibility of route navigation, increasing the functionality of the navigation software, and improving the efficiency and accuracy of navigation planning.

Figure 7:
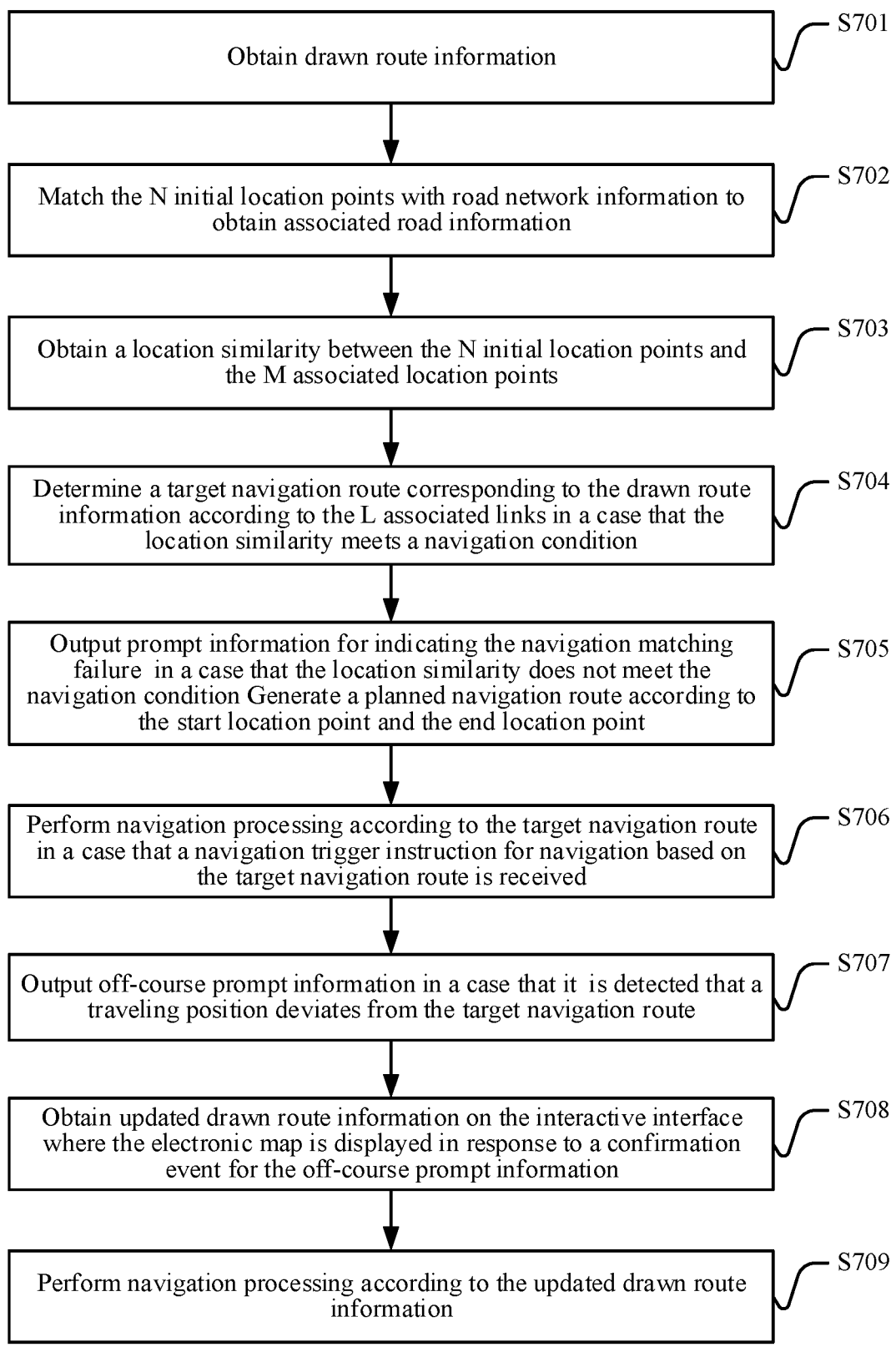
FIG. 7 is a schematic flowchart of another navigation processing method according to an embodiment of this application.

Based on the above navigation processing system and navigation processing method, an embodiment of this application provides another navigation processing method. FIG. 7 is a schematic flowchart of another navigation processing method according to an embodiment of this application. The navigation processing method shown in FIG. 7 may be performed by the service side device, or In some embodiments, may be performed by an intelligent terminal with powerful software and hardware performance. The navigation processing method shown in FIG. 7 includes the following steps.

S701: Obtain drawn route information, the drawn route information including N initial location points confirmed according to an electronic map, the N initial location points being determined according to a trajectory drawn based on a sliding operation on an interactive interface where the electronic map is displayed, and N being a positive integer.

S702: Match the N initial location points with road network information to obtain associated road information, the associated road information including M associated location points and L associated links.

S703: Obtain a location similarity between the N initial location points and the M associated location points.

S704: Determine a target navigation route corresponding to the drawn route information according to the L associated links when the location similarity meets a navigation condition.

The target navigation route can be generated directly according to the links and provided to the user client. In some embodiments, the target navigation route can also be provided again based on the L associated links to the user for editing, to fully determine a suitable target navigation route that meets the user demand.

In an embodiment, S704 may include: determining, when the location similarity meets the navigation condition, whether there are consecutive J associated location points in the M associated location points that are not determined as similar location points, where J is a positive integer less than M. For example, the numbers of the N initial location points and the M associated location points are large, for example, 1000, where only the consecutive J=20 associated location points are not determined as the similar location points. In this case, the location similarity meets the navigation condition, but associated location points on a road section or a link may still be far from the initial location points on the corresponding trajectory. In this case, the user can perform a confirmation operation again. If the determination result is yes, a similar navigation route is determined according to the L associated links, and the similar navigation route and route confirmation prompt information are outputted; the similar navigation route is determined as the target navigation route corresponding to the drawn route information in response to a confirmation event for the route confirmation prompt information; and an electronic map region corresponding to the J consecutive associated location points is zoomed in and displayed in response to an adjustment event for the route confirmation prompt information, a local trajectory drawn based on a re-sliding operation is obtained in the electronic map region, and the target navigation route is determined according to the local drawn route information corresponding to the obtained local trajectory.

In other words, the similar navigation route can be first determined based on the L associated links. If the user confirms that there is no problem, the similar navigation route can be directly determined as the target navigation route based on the route confirmation prompt information. If the user believes that one or more associated links corresponding to especially J consecutive associated location points in the similar navigation route are incorrect, the user can zoom in and display the region where the J consecutive associated location points are located, so that the user can slide the drawn local trajectory more accurately on the corresponding zoomed-in road section of the region, so as to determine new local initial location points corresponding to the local trajectory according to the local trajectory, obtain local associated location points corresponding to the local initial location points, then update the J consecutive associated location points in the M associated location points based on the local associated location points, and determine the target navigation route based on the updated M associated location points and the corresponding new associated links.

In an embodiment, the confirmation event for the route confirmation prompt information may include obtaining one or more of confirmation events such as a tap confirmation operation, a gesture confirmation operation, or a voice confirmation operation of the user based on the similar navigation route on the interactive interface where the electronic map is displayed.

In an embodiment, the adjustment event for the route confirmation prompt information may include obtaining a tap cancel operation, a gesture cancel operation, a voice cancel operation of the user based on the similar navigation route on the interactive interface where the electronic map is displayed, or failing to obtain the related operation of the user based on the similar navigation route on the interactive interface where the electronic map is displayed within a specified period of time. The confirmation event and the adjustment event need to include all operations that can reflect the confirmation or adjustment of the user for the route confirmation prompt information, and are not limited to the operations described above.

S705: Output prompt information for indicating the navigation matching failure when the location similarity does not meet the navigation condition; determine a start location point and an end location point from the N initial location points included in the drawn route information; and generate a planned navigation route according to the start location point and the end location point.

Through S705, it can be ensured that at least the navigation route can be obtained from the trajectory drawn by the user. In some embodiments, in other embodiments, when the location similarity does not meet the navigation condition, only the prompt information for indicating the navigation matching failure can be outputted, so as to prompt the user to re-slide in the electronic map region to draw a trajectory, without other processing.

S706: Perform navigation processing according to the target navigation route when a navigation trigger instruction for navigation based on the target navigation route is received.

The navigation trigger instruction may be an obtained tap operation, gesture operation, or voice operation of the user on the interactive interface where the electronic map is displayed. For example, the user taps the "Start Navigation" option on the interactive interface where the electronic map is displayed, and sends a voice instruction of "Start Navigation".

In an embodiment, route information corresponding to the target navigation route is obtained from the road network information when the navigation trigger instruction for navigation based on the target navigation route is received; guidance information corresponding to the target navigation route is obtained according to associated links corresponding to the target navigation route; and navigation processing is performed according to the route information corresponding to the target navigation route and the guidance information corresponding to the target navigation route.

The route information corresponding to the target navigation route is information used for describing the navigation route, and may include mileage information, road condition information, and estimated time information of the navigation route. The guidance information corresponding to the target navigation route is notification messages outputted during the navigation process, the guidance information is related to the routes, and a specific message notification is triggered at a specific time and location, for example, turn left 50 m ahead, sharp turn ahead, and please drive carefully.

S707: Output off-course prompt information if it is detected that a traveling location deviates from the target navigation route, where the off-course prompt information is prompt information for instructing to re-slide on the interactive interface where the electronic map is displayed to draw the trajectory.

The off-course prompt information can be displayed by displaying a dialog box on the interactive interface, so as to receive whether the user manually redraws the trajectory to determine the navigation route. On the interactive interface, the user can select to redraw the trajectory to trigger a confirmation event; or make no confirmation to trigger an update instruction so that the navigation APP performs navigation processing based on the current traveling location and the terminal location according to the default navigation rules. In an embodiment, off-course prompt information may also be outputted via voice, the user sending an instruction via voice, such as sending "Redraw" voice to trigger a subsequent confirmation event, or sending "Direct Navigation" to trigger a subsequent update event.

S708: Obtain updated drawn route information on the interactive interface where the electronic map is displayed in response to a confirmation event for the off-course prompt information, where initial location points included in the updated drawn route information are determined according to a trajectory drawn based on a re-sliding operation on the interactive interface where the electronic map is displayed.

S709: Perform navigation processing according to the updated drawn route information.

The navigation processing includes obtaining an updated target navigation route based on the updated drawn route information, and prompting traveling route, estimated time, congestion, and the like to the user. In other words, the updated drawn route information can be used as the new drawn route information, to repeat the above steps.

In one embodiment, after the off-course prompt information is outputted, an interface for receiving user operations can be displayed, and the user can tap or voice to send related instructions, to trigger a confirmation event, so as to perform related processing for a confirmation event described in S708 and S709. In other embodiments, the user may tap or voice to send the related instructions to trigger an update event, so as to perform related processing according to the update event for the off-course prompt information. The specific description of the update event is as follows.

In some embodiments, after the off-course prompt information is outputted, if the update event for the off-course prompt information is received, the target navigation route can be updated in response to the update event for the off-course prompt information according to the traveling location and the end location point in the N initial location points included in the drawn route information. In other words, after off course, the navigation function of the navigation APP can be used to provide the most basic navigation service. Based on the current traveling location and destination, based on the existing data and algorithms in the navigation APP, a navigation route can be generated and the original target navigation route can be updated.

In some embodiments, after the off-course prompt information is outputted, if the update event for the off-course prompt information is received, the target navigation route can be updated in response to the update event for the off-course prompt information according to the traveling location, a location point closest to the traveling location in the N initial location points included in the drawn route information, and the end location point in the N initial location points included in the drawn route information. In other words, after off course, based on the current traveling location of the user, the user can be re-navigated to the remaining section of the target navigation route set previously to ensure that this navigation task is completed as much as possible according to the user demand.

In an embodiment, detecting that the traveling location deviates from the target navigation route may include: determining that the traveling location deviates from the target navigation route if it is detected that the distance between the consecutive specified number of traveling locations and the location points corresponding to the target navigation route is greater than a specified distance.

In an embodiment, the confirmation event for the off-course prompt information may include obtaining one or more of confirmation events such as a tap confirmation operation, a gesture confirmation operation, or a voice confirmation operation of the user based on the off-course prompt information on the interactive interface where the electronic map is displayed.

In an embodiment, the adjustment event for the off-course prompt information may include obtaining a tap cancel operation, a gesture cancel operation, a voice cancel operation of the user based on the off-course prompt information on the interactive interface where the electronic map is displayed, or failing to obtain one or more of the adjustment events such as the related operation of the user based on the similar navigation route on the interactive interface where the electronic map is displayed within a specified period of time. The confirmation event and the adjustment event need to include all operations that can reflect the confirmation or adjustment of the user for the off-course prompt information, and are not limited to the operations described above.

In an embodiment, the location point closest to the traveling location in the N initial location points is the location point closest to the traveling location in the traveling direction in the N initial location points. For example, as shown in FIG. 7, if the distances between points A1 and A2 on the target navigation route and the traveling location B are the same, the point A2 in the travel direction is determined as the location point closest to the traveling location B.

According to one embodiment, on one hand, navigation errors in the navigation APP can be avoided. On the other hand, when the user is manually drawing a route, one or more intermediate points that are intended to pass through are included in the drawn route, so as to ensure that the finally calculated navigation route passes through these intermediate points, or routes that include these shortcut sections are drawn, to reach the destination more quickly, thereby greatly improving the flexibility of route navigation, increasing the functionality of the navigation software, and improving the efficiency and accuracy of navigation planning.

Figure 8:
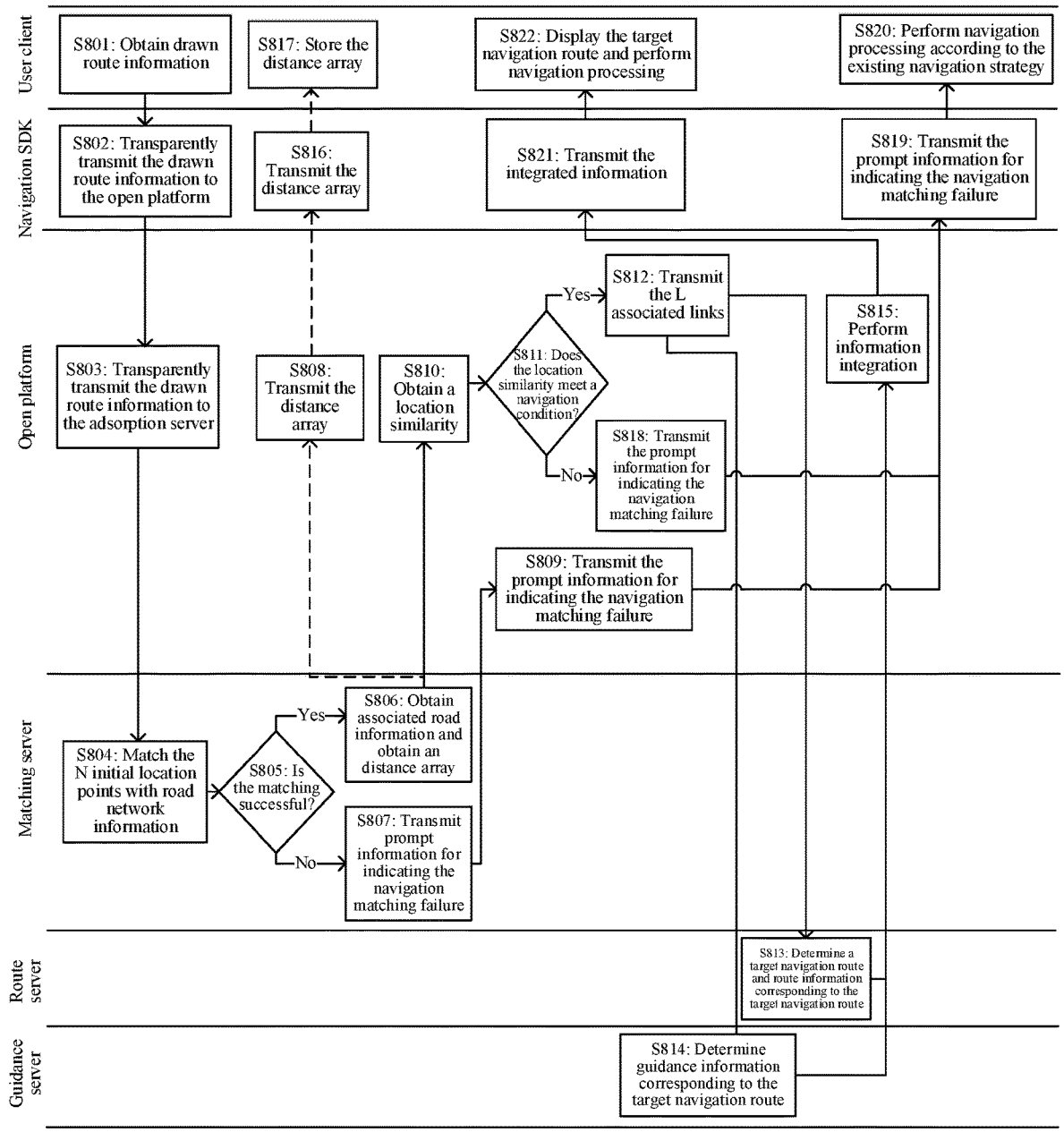
FIG. 8 is a schematic flowchart of another navigation processing method according to an embodiment of this application.

Based on the above navigation processing system and navigation processing method, an embodiment of this application provides another navigation processing method. FIG. 8 is a schematic flowchart of another navigation processing method according to an embodiment of this application. The navigation processing method shown in FIG. 8 may be performed by the user client, the navigation SDK, and the service side device. The service side device includes a server named an open platform, an matching server for matching location points, a guidance server providing guidance information, and a route server providing route information. The navigation processing method shown in FIG. 8 includes the following steps.

S801: The user client obtains drawn route information, the drawn route information including N initial location points confirmed according to an electronic map, the N initial location points being determined according to a trajectory drawn based on a sliding operation on an interactive interface where the electronic map is displayed, and N being a positive integer.

S802: The navigation SDK passes through the drawn route information to the open platform.

S803: The open platform receives the drawn route information transparently transmitted by the navigation SDK and passes through the drawn route information to the matching server.

S804: The matching server matches the N initial location points with road network information.

S805: Determine whether the matching is successful.

S806: When the matching is successful, obtain associated road information and a distance array. The associated road information includes M associated location points and L associated links, and M associated location points and the L associated links are transmitted to the open platform; and if the matching is successful, the matching server can further obtain the distance array and transmit the distance array to the open platform. Data in the distance array is distances between each of the N initial location points and the M associated location points.

S807: When the matching fails, transmit prompt information for indicating the navigation matching failure to the open platform.

S808: When the open platform receives the distance array, transmit the distance array to the navigation SDK.

S809: When the open platform receives the prompt information for indicating the navigation matching failure, transmit the prompt information for indicating the navigation matching failure to the Navigation SDK.

S810: When the open platform receives the M associated location points and the L associated links transmitted by the matching server, obtain a location similarity between N initial location points and M associated location points.

S811: Determine whether the location similarity meets a navigation condition.

S812: When the location similarity meets the navigation condition, the open platform transmits the L associated links to the route server and the guidance server.

S813: The route server receives the L associated links transmitted by the open platform, determines a target navigation route corresponding to the drawn route information and route information corresponding to the target navigation route according to the L associated links, and transmits the target navigation route and the route information corresponding to the target navigation route to the open platform.

S814: The guidance server receives the L associated links transmitted by the open platform, determines guidance information corresponding to the target navigation route according to the L associated links, and transmits the guidance information to the open platform.

S815: The open platform receives the target navigation route and the route information corresponding to the target navigation route transmitted by the route server, receives the guidance information corresponding to the target navigation route transmitted by the guidance server, integrates the target navigation route, the route information corresponding to the target navigation route, and the guidance information corresponding to the target navigation route, and transmits the integrated information to the navigation SDK.

S816: When the navigation SDK receives the distance array, transmit the distance array to the user client.

S817: When the user client receives the distance array, store the distance array.

S818: When the location similarity does not meet the condition, transmit the prompt information for indicating the navigation matching failure to the navigation SDK.

S819: When the navigation SDK receives the prompt information for indicating the navigation matching failure, transmit the prompt information for indicating the navigation matching failure to the user client.

S820: When the user client receives the prompt information indicating the navigation matching failure, the navigation APP performs navigation processing according to the existing navigation strategy.

S821: When the navigation SDK receives the integrated information, transmit the integrated information to the user client.

S822: When the user client receives the integrated information, display the target navigation route and perform navigation processing.

According to one embodiment, on one hand, navigation errors in the navigation APP can be avoided. On the other hand, when the user is manually drawing a route, one or more intermediate points that are intended to pass through are included in the drawn route, so as to ensure that the finally calculated navigation route passes through these intermediate points, or routes that include these shortcut sections are drawn, to reach the destination more quickly, thereby greatly improving the flexibility of route navigation, increasing the functionality of the navigation software, and improving the efficiency and accuracy of navigation planning.

Figure 9:
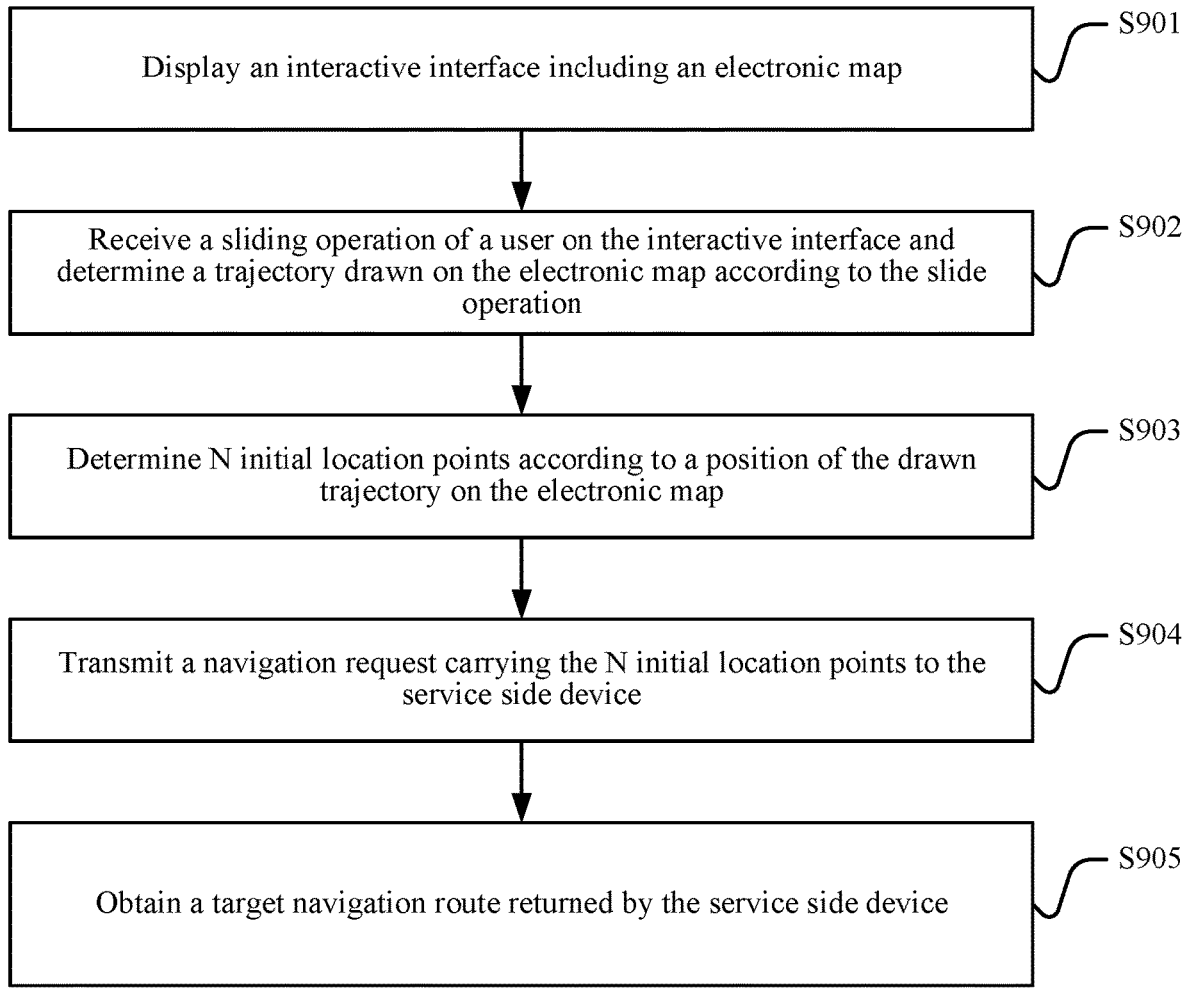
FIG. 9 is a schematic flowchart of a navigation processing method on a terminal according to an embodiment of this application.

FIG. 9 is a schematic flowchart of a navigation processing method on a terminal according to an embodiment of this application. The navigation processing method in one embodiment may be performed by an intelligent terminal. The intelligent terminal can display an interactive interface according to an electronic map and receive a sliding operation of a user, and the like. The intelligent terminal may be, for example, a smartphone, a tablet computer, or a smart wearable device. The method in one embodiment includes the following steps.

S901: Display an interactive interface including an electronic map.

The interactive interface including the electronic map may be, for example, shown in FIG. 4a, and on the electronic map, the user can perform human-computer interaction by manual sliding or the like.

S902: Obtain a sliding operation of a user on the interactive interface, and determine a trajectory drawn on the electronic map according to the sliding operation.

The user can operate a corresponding navigation APP through the interactive interface and select a function mode of manually drawing a navigation route. In this function mode, the navigation APP displays part of a map region on the interactive interface, and a sliding operation of the user in the part of the map region of the interactive interface, such as touching and moving with one finger on the interactive interface, can generate a sliding trajectory, and the drawn route information can be obtained based on the sliding trajectory and the interactive interface. The part of the map region can be selected by other user operations different from the sliding operation generating the trajectory. For example, area local region in the part of the map region is zoomed in by the sliding operation with two fingers away from each other, the part of the map region of a larger area is displayed by the sliding operation with two fingers from far to near, and the part of the map region is moved up, down, left and right by a tap operation greater than a pressure threshold and then sliding. In addition, on the electronic map, the drawn route information is composed of a plurality of location points on the electronic map, and the N initial location points are some or all of the location points.

If the user does not select to draw the navigation route manually, the navigation APP uses a default description to display the electronic map on the interactive interface. If the user slides left and right on the interactive interface where the electronic map is located, a map display region on the interactive interface is moved left and right, and if the user slides up and down on the interactive interface where the electronic map is located, a map display region on the interactive interface is moved up and down without any trajectory.

S903: Determine N initial location points according to a location of the drawn trajectory on the electronic map.

A trajectory point set can be determined on the trajectory by sampling, and then N initial location points can be determined based on locations of trajectory points on the electronic map in the trajectory point set. The distances between the initial location points may be the same or different, which is not limited in this application.

S904: Transmit a navigation request carrying the N initial location points to a service side device, the navigation request being used for requesting the service side device to perform navigation processing according to the N initial location points.

The N initial location points may be transmitted to the service side device as drawn route information, and the service side device obtains target navigation information through a series of processing. For all the related processing performed by the service side device based on the drawn route information, reference may be made to the description of the related content in the foregoing embodiments. Details are not described herein again.

S905: Obtain a target navigation route returned by the service side device.

After the target navigation route is obtained, the target navigation route can be displayed in combination with the electronic map. For one implementation of the displaying, reference may be made to FIG. 4b.

In an embodiment, when obtaining the target navigation route, the service side device can first obtain a similar navigation route, determine J associated location points and transmit the J associated location points to the intelligent terminal for confirmation, and then obtain the final target navigation route according to a confirmation result. For the process of determining the similar navigation routes and obtaining the final target navigation route by the service side device, reference may be made to the description of the foregoing embodiments.

The intelligent terminal can receive a second trigger instruction from the service side device, where the second trigger instruction carries J consecutive associated location points; and determine an electronic map region corresponding to the J consecutive associated location points in response to the second trigger instruction, and zoom in and display the electronic map region corresponding to the J consecutive associated location points.

The zooming in and displaying is to facilitate the user to draw a trajectory on the zoomed-in local electronic map region to determine accurate local initial location points, so that the service side device determines new local initial location points corresponding to the local trajectory according to the local trajectory, obtains local associated location points corresponding to the local initial location points, then updates the J consecutive associated location points in the M associated location points based on the local associated location points, and determines the target navigation route based on the updated M associated location points and the corresponding new associated links.

In one embodiment, the user can visually obtain a plurality of location points by manual drawing on the navigation electronic map to request the service to perform navigation processing, can conveniently incorporate the user's known shortcut sections and route sections that need to be passed into the navigation route, and can also avoid the route sections that cannot be passed due to causes such as road works, thereby greatly improving the flexibility of route navigation, increasing the functionality of the navigation software, and improving the efficiency and accuracy of navigation planning.

Figure 10:
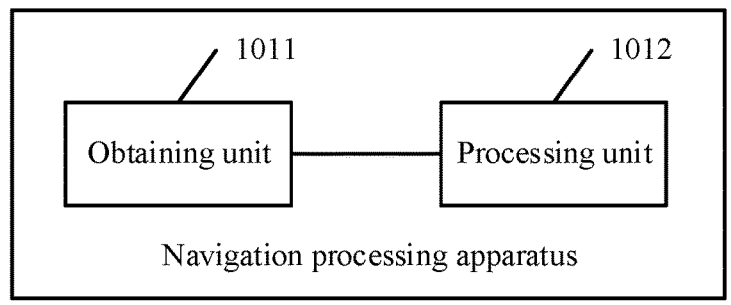
FIG. 10 is a navigation processing apparatus according to an embodiment of this application.

FIG. 10 is a navigation processing apparatus according to an embodiment of this application. The apparatus may be disposed in a service side device, such as the foregoing related server. The apparatus includes the following units.

an acquiring unit 1011, configured to obtain drawn route information, the drawn route information including N initial location points confirmed according to an electronic map, the N initial location points being determined according to a trajectory drawn based on a sliding operation on an interactive interface where an electronic map is displayed, and N being a positive integer; and a processing unit 1012, configured to match the N initial location points with road network information to obtain associated road information, the associated road information including M associated location points and L associated links; obtain a location similarity between the N initial location points and the M associated location points; and determine a target navigation route corresponding to the drawn route information according to the L associated links when the location similarity meets a navigation condition.

In an embodiment, the processing unit 1012 is configured to match the N initial location points with location points on roads included in the road network information; obtain the M associated location points on an associated road that matches the N initial location points when the matching is successful; and determine L associated links according to the M associated location points.

In an embodiment, the processing unit 1012 is further configured to output, when the matching the N start location points with location points on roads included in the road network information fails, prompt information for indicating the navigation matching failure; determine a start location point and an end location point from the N initial location points; and generate a planned navigation route according to the start location point and the end location point.

In an embodiment, the processing unit 1012 is configured to determine K similar location points from the M associated location points according to location coordinates of the N initial location points and location coordinates of the M associated location points, where distances between the K similar location points and at least one of the N initial location points are less than a distance threshold; and determine a ratio of K to N as the location similarity.

In an embodiment, the processing unit 1012 is configured to determine a similar navigation route according to the L associated links when the location similarity meets the navigation condition and there are J consecutive associated location points in the M associated location points that are not determined as similar location points, and output the similar navigation route and route confirmation prompt information, where J is a positive integer less than M; determine the similar navigation route as the target navigation route corresponding to the drawn route information in response to a confirmation event for the route confirmation prompt information; zoom in and display an electronic map region corresponding to the J consecutive associated location points in response to an adjustment event for the route confirmation prompt information, to obtain a local trajectory drawn based on a re-sliding operation in the electronic map region; and determine the target navigation route according to local drawn route information corresponding to the obtained local trajectory.

In an embodiment, the processing unit 1012 is further configured to perform navigation processing according to the target navigation route when a navigation trigger instruction for navigation based on the target navigation route is received; output off-course prompt information when it is detected that a traveling location deviates from the target navigation route where the off-course prompt information includes: prompt information for prompting to re-slide to draw on the interactive interface; obtain updated drawn route information on the interactive interface in response to a confirmation event for the off-course prompt information, where initial location points included in the updated drawn route information are determined according to the trajectory drawn on the interactive interface based on a re-sliding operation; and perform navigation processing according to the updated drawn route information.

In an embodiment, the processing unit 1012 is further configured to update the target navigation route in response to an update event for the off-course prompt information according to the traveling location and the end location point in the N initial location points included in the drawn route information; or update the target navigation route in response to an update event for the off-course prompt information according to the traveling location, a location point closest to the traveling location in the N initial location points included in the drawn route information and the end location point in the N initial location points included in the drawn route information.

In an embodiment, the processing unit 1012 is further configured to obtain route information corresponding to the target navigation route from the road network information when the navigation trigger instruction is received; obtain guidance information corresponding to the target navigation route according to associated links corresponding to the target navigation route; and perform navigation processing according to the route information and the guidance information.

For specific implementation of the obtaining unit 1011 and the processing unit 1012 included in the apparatus in one embodiment, reference may be made to descriptions of the related content in the foregoing method embodiments. Details are not described herein again.

In one embodiment, a series of data processing logic are defined based on the drawn route manually drawn by the user on the electronic map, and the final corresponding navigation route is obtained and provided to the user. On one hand, when an existing road section is prohibited for causes such as road works but the user knows that the road section is prohibited, the user can directly bypass this road section through the drawn route to avoid navigation errors in the navigation APP. On the other hand, the user can manually draw one or more intermediate points that are intended to pass through into the drawn route to ensure that the finally calculated navigation route passes through these intermediate points. Moreover, for some shortcut sections to reach a destination that are clear to the user, the user can also include these shortcut sections in the drawn route to reach the destination more quickly, thereby greatly improving the flexibility of route navigation, increasing the functionality of navigation software, and improving the efficiency and accuracy of navigation planning.

Figure 11:
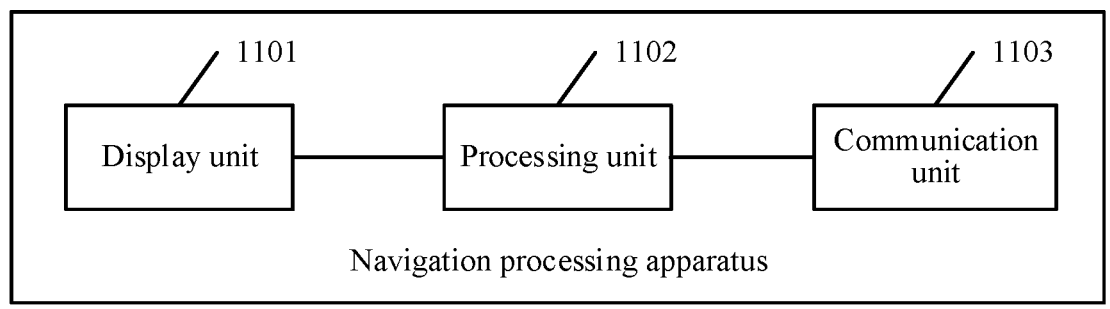
FIG. 11 is another navigation processing apparatus according to an embodiment of this application.

FIG. 11 is a navigation processing apparatus according to an embodiment of this application. The navigation processing apparatus may be disposed in the foregoing intelligent terminal. The apparatus includes the following units.

a display unit 1101, configured to display an interactive interface including an electronic map;

a processing unit 1102, configured to obtain a sliding operation of a user on the interactive interface, and determine a trajectory drawn on the electronic map according to the sliding operation; and determine N initial location points according to a location of the drawn trajectory on the electronic map; and a communication unit 1103, configured to transmit a navigation request carrying the N initial location points to a service side device, where the navigation request is used for requesting the service side device to perform navigation processing according to the N initial location points; and obtain a target navigation route returned by the service side device.

In an embodiment, the communication unit 1103 is further configured to receive a second trigger instruction transmitted by the service side device, where the second trigger instruction carries J consecutive associated location points.

The processing unit 1102 is further configured to determine an electronic map region corresponding to the J consecutive associated location points in response to the second trigger instruction, and zoom in and display the electronic map region corresponding to the J consecutive associated location points.

For specific implementation of the units included in the apparatus in one embodiment, reference may be made to descriptions of the related content in the foregoing method embodiments. Details are not described herein again.

In one embodiment, the user can visually obtain a plurality of location points by manual drawing on the navigation electronic map to request the service to perform navigation processing, conveniently incorporate the user's known shortcut sections and route sections that need to be passed into the navigation route, and also avoid the route sections that cannot be passed due to causes such as road works, thereby greatly improving the flexibility of route navigation, increasing the functionality of the navigation software, and improving the efficiency and accuracy of navigation planning.

Figure 12:
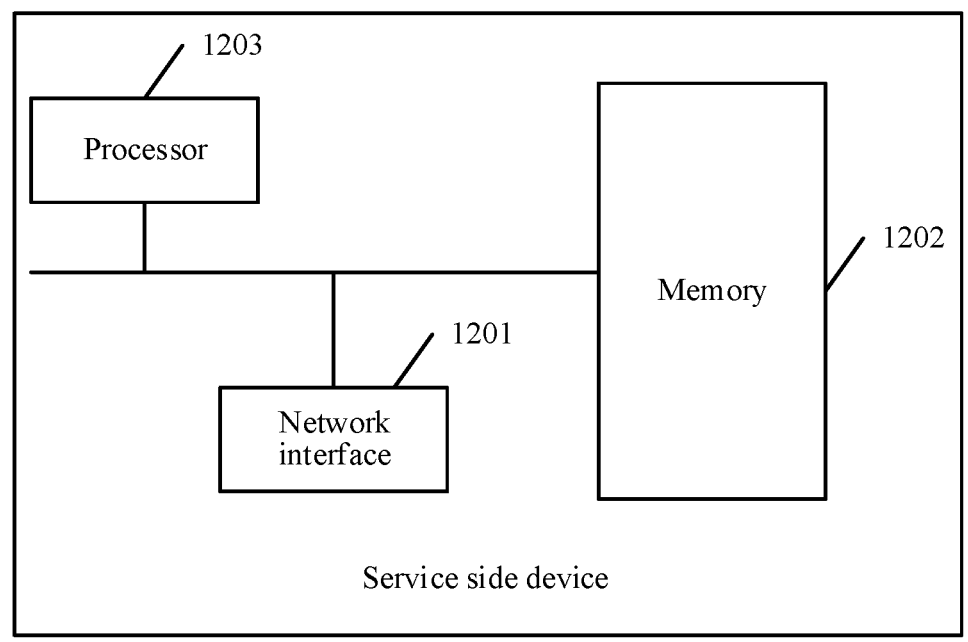
FIG. 12 is a schematic structural diagram of a service side device according to an embodiment of this application.

FIG. 12 is a schematic structural diagram of a service side device according to an embodiment of this application. The service side device may refer to the foregoing related server. The service side device includes a network interface 1201, a memory 1202, and a processor 1203, and further includes some other components such as a power supply module, a heat radiation module, and various interfaces capable of connecting to other devices, such as a data interface of an external display.

The processor 1203 may be a central processing unit (CPU). The processor 1203 may further include a hardware chip. The hardware chip may be an application-specific integrated circuit (ASIC), a programmable logic device (PLD), or the like. The PLD may be a field-programmable gate array (FPGA), a generic array logic (GAL), or the like.

The memory 1202 may further include a volatile memory such as a random access memory (RAM); or the memory 1202 may include a non-volatile memory such as a flash memory or a solid-state drive (SSD). The memory 1202 may alternatively include a combination of the foregoing types of memories.

The memory 1202 is configured to store a computer program, and the processor 1203 is configured to execute the computer program to implement the corresponding method flows or corresponding functions in the foregoing embodiments.

In an embodiment, the processor 1203 calls the computer program stored in the memory 1202 to obtain drawn route information, the drawn route information including N initial location points confirmed according to an electronic map, the N initial location points being determined according to a trajectory drawn based on a sliding operation on an interactive interface where the electronic map is displayed, and N being a positive integer; match the N initial location points with road network information to obtain associated road information, the associated road information including M associated location points and L associated links; obtain a location similarity between the N initial location points and the M associated location points; and determine a target navigation route corresponding to the drawn route information according to the L associated links when the location similarity meets a navigation condition.

In an embodiment, the processor 1203 is configured to match the N initial location points with location points on roads included in the road network information; obtain the M associated location points on an associated road that matches the N initial location points when the matching is successful; and determine the L associated links according to the M associated location points.

In an embodiment, the processor 1203 is further configured to output, when the matching the N start location points with location points on roads included in the road network information fails, prompt information for indicating the navigation matching failure; determine a start location point and an end location point from the N initial location points;

and generate a planned navigation route according to the start location point and the end location point.

In an embodiment, the processor 1203 is configured to determine K similar location points from the M associated location points according to location coordinates of the N initial location points and location coordinates of the M associated location points, where distances between the K similar location points and at least one of the N initial location points are less than a distance threshold; and determine a ratio of K to N as the location similarity.

In an embodiment, the processor 1203 is configured to determine a similar navigation route according to the L associated links when the location similarity meets the navigation condition and there are J consecutive associated location points in the M associated location points that are not determined as similar location points, and output the similar navigation route and route confirmation prompt information, where J is a positive integer less than M; determine the similar navigation route as the target navigation route in response to a confirmation event for the route confirmation prompt information; zoom in and display an electronic map region corresponding to the J consecutive associated location points in response to an adjustment event for the route confirmation prompt information, to obtain a local trajectory drawn based on a re-sliding operation in the electronic map region; and determine the target navigation route according to local drawn route information corresponding to the obtained local trajectory.

In an embodiment, the processor 1203 is further configured to perform navigation processing according to the target navigation route when a navigation trigger instruction for navigation based on the target navigation route is received; output off-course prompt information when it is detected that a traveling location deviates from the target navigation route, where the off-course prompt information includes: prompt information for prompting to re-slide to draw on the interactive interface; obtain updated drawn route information on the interactive interface in response to a confirmation event for the off-course prompt information, where initial location points included in the updated drawn route information are determined according to the trajectory drawn on the interactive interface based on a re-sliding operation; and perform navigation processing according to the updated drawn route information.

In an embodiment, the processor 1203 is further configured to update the target navigation route in response to an update event for the off-course prompt information according to the traveling location and the end location point in the N initial location points included in the drawn route information, or update the target navigation route in response to an update event for the off-course prompt information according to the traveling location, a location point closest to the traveling location in the N initial location points included in the drawn route information and the end location point in the N initial location points included in the drawn route information.

In an embodiment, the processor 1203 is configured to obtain route information corresponding to the target navigation route from the road network information when the navigation trigger instruction is received, obtain guidance information corresponding to the target navigation route according to associated links corresponding to the target navigation route; and perform navigation processing according to the route information and the guidance information.

For specific implementation of the processor 1203 in one embodiment, reference may be made to descriptions of the related content in the foregoing method embodiments. Details are not described herein again.

In one embodiment, a series of data processing logic are defined based on the drawn route manually drawn by the user on the electronic map, and the final corresponding navigation route is obtained and provided to the user. On one hand, when an existing road section is prohibited for causes such as road works but the user knows that the road section is prohibited, the user can directly bypass this road section through the drawn route to avoid navigation errors in the navigation APP. On the other hand, the user can manually draw one or more intermediate points that are intended to pass through into the drawn route to ensure that the finally calculated navigation route passes through these intermediate points. Moreover, for some shortcut sections to reach a destination that are clear to the user, the user can also include these shortcut sections in the drawn route to reach the destination more quickly, thereby greatly improving the flexibility of route navigation, increasing the functionality of navigation software, and improving the efficiency and accuracy of navigation planning.

Figure 13:
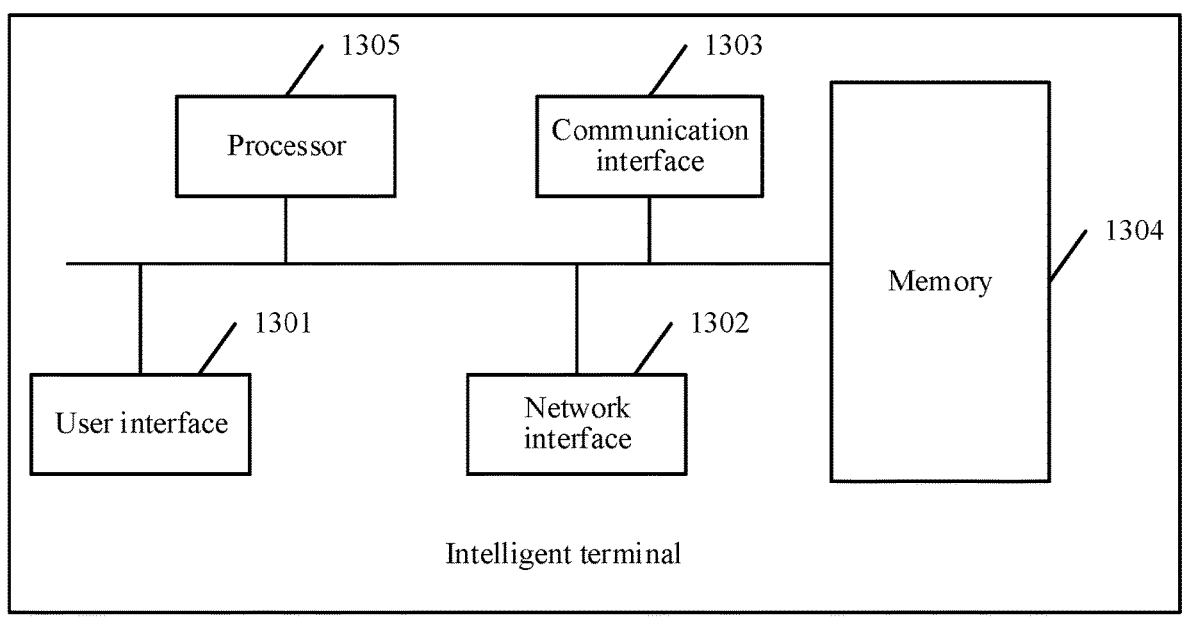
FIG. 13 is a schematic structural diagram of an intelligent terminal according to an embodiment of this application.

FIG. 13 is a structural schematic diagram of an intelligent terminal according to an embodiment of this application. The intelligent terminal according to one embodiment may refer to a terminal with a network function and a touch screen function such as a smartphone, a tablet computer, or a smart wearable device. The intelligent terminal includes a memory 1304, a processor 1305, a user interface 1301, a network interface 1302, and a communication interface 1303, and may further include a power supply, various required housing structures, and the like.

The user interface 1301 may be, for example, a touch display screen, capable of receiving touch screen operations of the user and displaying corresponding data, interactive interfaces, and the like. The network interface 1302 and the communication interface 1303 can ensure that the intelligent terminal can access the Internet and various servers through a computer network and a mobile communication network.

The processor 1305 may be a CPU. The processor 1305 may further include a hardware chip, such as an ASIC or a PLD. The PLD may be an FPGA, a GAL, or the like. The memory 1304 may include a volatile memory, such as a RAM; or the memory 1304 may include a non-volatile memory such as a flash memory or an SSD. The memory 1304 may alternatively include a combination of the foregoing types of memories.

The memory 1304 stores a computer program, and the processor 1305 calls the computer program to implement the navigation processing method of the corresponding embodiment shown in FIG. 9.

In an embodiment, the processor 1305 calls the computer program to display an interactive interface including an electronic map, obtain a sliding operation of a user on the interactive interface, and determine a trajectory drawn on the electronic map according to the sliding operation; determines N initial location points according to a location of the drawn trajectory on the electronic map; transmits a navigation request carrying the N initial location points to a service side device, the navigation request being used for requesting the service side device to perform navigation processing according to the N initial location points; and obtains a target navigation route returned by the service side device.

In an embodiment, the processor 1305 is further configured to receive a second trigger instruction transmitted by the service side device, where the second trigger instruction carries J consecutive associated location points; and determine an electronic map region corresponding to the J consecutive associated location points in response to the second trigger instruction, and zoom in and display the electronic map region corresponding to the J consecutive associated location points.

For specific implementation of the processor 1203 in one embodiment, reference may be made to descriptions of the related content of the foregoing method embodiments. Details are not described herein again.

In one embodiment, the user can visually obtain a plurality of location points by manual drawing on the navigation electronic map to request the service to perform navigation processing, can conveniently incorporate the user's known shortcut sections and route sections that need to be passed into the navigation route, and can also avoid the route sections that cannot be passed due to causes such as road works, thereby greatly improving the flexibility of route navigation, increasing the functionality of the navigation software, and improving the efficiency and accuracy of navigation planning.

An embodiment of this application further provides a computer program product or a computer program, including computer instructions, the computer instructions being stored in a computer-readable storage medium. A processor of a computer device reads the computer instructions from the computer-readable storage medium, and executes the computer instructions, to cause the computer device to perform the foregoing navigation processing method.

A sequence of the steps of the method in the embodiments of this application may be adjusted, and steps may also be combined or removed according to specific requirements.

The modules in the apparatus in the embodiments of this application may be combined, divided, and deleted according to specific requirements.

A person of ordinary skill in the art may understand that all or some of the steps of the various methods in the foregoing embodiments may be implemented by a program instructing relevant hardware. The program may be stored in a computer-readable storage medium. The storage medium may include: a flash drive, a read-only memory (ROM), a RAM, a magnetic disk, an optical disc, and the like.

The foregoing descriptions are merely some embodiments of this application, and are not intended to limit the scope of this application. A person skilled in the art may understand all or some processes of the foregoing embodiments, and equivalent modifications made according to the claims of this application shall still fall within the scope of this disclosure.

What is claimed is:

1. A navigation processing method, performed by a computing device, the method comprising:
    obtaining drawn route information transmitted from a user client, the drawn route information comprising N initial location points confirmed according to an electronic map, the N initial location points being determined according to a trajectory drawn based on a sliding operation on an interactive interface of the user client where the electronic map is displayed, and N being a positive integer;
    matching the N initial location points with location points on roads comprised in road network information by calling an external road binding service;
    obtaining, from the external road binding service, M associated location points on an associated road that matches the N initial location points if the matching is successful, the location points being longitude and latitude point strings;
    determining, by using a link information query service, L associated links according to the M associated location points, M and L being positive integers, the links being link strings comprising multiple consecutive longitude and latitude points;
    obtaining a location similarity between the N initial location points and the M associated location points; and
    determining a target navigation route corresponding to the drawn route information according to the L associated links when the location similarity meets a navigation condition; and
    transmitting the target navigation route to a guidance and route server, the guidance and route server being coupled to the user client and configured to provide navigation guidance to the user client based on the electronic map and the target navigation route.

2. The method according to claim 1, further comprising:
    outputting prompt information for indicating a navigation matching failure if the matching the N initial location points with location points on roads comprised in the road network information fails;
    determining a start location point and an end location point from the N initial location points; and
    generating a planned navigation route according to the start location point and the end location point.

3. The method according to claim 1, wherein the obtaining a location similarity between the N initial location points and the M associated location points comprises:
    determining K similar location points from the M associated location points according to location coordinates of the N initial location points and location coordinates of the M associated location points, wherein distances between the K similar location points and at least one of the N initial location points are less than a distance threshold, and K is a positive integer less than or equal to M; and
    determining a ratio of K to N as the location similarity.

4. The method according to claim 1, wherein the determining a target navigation route corresponding to the drawn route information according to the L associated links when the location similarity meets a navigation condition comprises:
    determining a similar navigation route according to the L associated links when the location similarity meets the navigation condition, and there are J consecutive associated location points in the M associated location points that are not determined as similar location points, and outputting the similar navigation route and route confirmation prompt information, wherein J is a positive integer less than M;
    determining the similar navigation route as the target navigation route in response to a confirmation event for the route confirmation prompt information;
    zooming in and displaying an electronic map region corresponding to the J consecutive associated location points in response to an adjustment event for the route confirmation prompt information, and obtaining a local trajectory drawn based on a re-sliding operation in the electronic map region; and
    determining the target navigation route according to local drawn route information corresponding to the obtained local trajectory.

5. The method according to claim 1, further comprising:
performing navigation processing according to the target navigation route when a navigation trigger instruction for navigation based on the target navigation route is received;
outputting off-course prompt information when a traveling location deviates from the target navigation route, wherein the off-course prompt information comprises: prompt information for re-sliding to draw on the interactive interface;
receiving updated drawn route information on the interactive interface in response to a confirmation event for the off-course prompt information, wherein initial location points comprised in the updated drawn route information are determined according to a trajectory drawn on the interactive interface based on a re-sliding operation; and
performing navigation processing according to the updated drawn route information.

6. The method according to claim 5, further comprising:
updating the target navigation route in response to an update event for the off-course prompt information according to the traveling location and the end location point in the N initial location points comprised in the drawn route information.

7. The method according to claim 5, further comprising:
updating the target navigation route in response to an update event for the off-course prompt information according to the traveling location, a location point closest to the traveling location in the N initial location points comprised in the drawn route information, and the end location point in the N initial location points comprised in the drawn route information.

8. The method according to claim 5, wherein the performing navigation processing according to the target navigation route when a navigation trigger instruction for navigation based on the target navigation route is received comprises:
obtaining route information corresponding to the target navigation route from the road network information when the navigation trigger instruction is received;
obtaining guidance information corresponding to the target navigation route according to associated links corresponding to the target navigation route; and
performing navigation processing according to the route information and the guidance information.

9. The method according to claim 1, further comprising:
obtaining, from the link information query service, a link identifier of a road where one or more location points corresponding to one or more of the longitude and latitude point strings are located; and
determining one of the L associated links based on the link identifier.

10. A non-transitory computer readable storage medium, storing a computer program, the computer program, when being executed by a processor of a computing device, causing the processor to perform:
obtaining drawn route information transmitted from a user client, the drawn route information comprising N initial location points confirmed according to an electronic map, the N initial location points being determined according to a trajectory drawn based on a sliding operation on an interactive interface of the user client where the electronic map is displayed, and N being a positive integer;
matching the N initial location points with location points on roads comprised in road network information by calling an external road binding service;
obtaining, from the external road binding service, M associated location points on an associated road that matches the N initial location points if the matching is successful, the location points being longitude and latitude point strings;
determining, by using a link information query service, L associated links according to the M associated location points, M and L being positive integers, the links being link strings comprising multiple consecutive longitude and latitude points;
obtaining a location similarity between the N initial location points and the M associated location points; and
determining a target navigation route corresponding to the drawn route information according to the L associated links when the location similarity meets a navigation condition; and
transmitting the target navigation route to a guidance and route server, the guidance and route server being coupled to the user client and configured to provide navigation guidance to the user client based on the electronic map and the target navigation route.

11. The computer readable storage medium according to claim 10, the method further comprising:
outputting prompt information for indicating a navigation matching failure if the matching the N start location points with location points on roads comprised in the road network information fails;
determining a start location point and an end location point from the N initial location points; and
generating a planned navigation route according to the start location point and the end location point.

12. The computer readable storage medium according to claim 10, wherein the obtaining a location similarity between the N initial location points and the M associated location points comprises:
determining K similar location points from the M associated location points according to location coordinates of the N initial location points and location coordinates of the M associated location points, wherein distances between the K similar location points and at least one of the N initial location points are less than a distance threshold, and K is a positive integer less than or equal to M; and
determining a ratio of K to N as the location similarity.

13. The computer readable storage medium according to claim 10, wherein the determining a target navigation route corresponding to the drawn route information according to the L associated links when the location similarity meets a navigation condition comprises:
determining a similar navigation route according to the L associated links when the location similarity meets the navigation condition, and there are J consecutive associated location points in the M associated location points that are not determined as similar location points, and outputting the similar navigation route and route confirmation prompt information, wherein J is a positive integer less than M;
determining the similar navigation route as the target navigation route in response to a confirmation event for the route confirmation prompt information;
zooming in and displaying an electronic map region corresponding to the J consecutive associated location points in response to an adjustment event for the route confirmation prompt information, and obtaining a local trajectory drawn based on a re-sliding operation in the electronic map region; and determining the target navigation route according to local drawn route information corresponding to the obtained local trajectory.

14. The computer readable storage medium according to claim 10, the method further comprising:

performing navigation processing according to the target navigation route when a navigation trigger instruction for navigation based on the target navigation route is received;

outputting off-course prompt information when a traveling location deviates from the target navigation route, wherein the off-course prompt information comprises: prompt information for re-sliding to draw on the interactive interface;

receiving updated drawn route information on the interactive interface in response to a confirmation event for the off-course prompt information, wherein initial location points comprised in the updated drawn route information are determined according to a trajectory drawn on the interactive interface based on a re-sliding operation; and performing navigation processing according to the updated drawn route information.

15. The computer readable storage medium according to claim 14, the method further comprising:

updating the target navigation route in response to an update event for the off-course prompt information according to the traveling location and the end location point in the N initial location points comprised in the drawn route information.

16. The computer readable storage medium according to claim 14, the method further comprising:

updating the target navigation route in response to an update event for the off-course prompt information according to the traveling location, a location point closest to the traveling location in the N initial location points comprised in the drawn route information, and the end location point in the N initial location points comprised in the drawn route information.

17. The computer readable storage medium according to claim 14, wherein the performing navigation processing according to the target navigation route when a navigation trigger instruction for navigation based on the target navigation route is received comprises:

obtaining route information corresponding to the target navigation route from the road network information when the navigation trigger instruction is received;

obtaining guidance information corresponding to the target navigation route according to associated links corresponding to the target navigation route; and performing navigation processing according to the route information and the guidance information.

18. A navigation processing apparatus, comprising:

a memory, configured to store a computer program; and a processor, configured to execute the computer program to implement:

obtaining drawn route information transmitted from a user client, the drawn route information comprising N initial location points confirmed according to an electronic map, the N initial location points being determined according to a trajectory drawn based on a sliding operation on an interactive interface of the user client where the electronic map is displayed, and N being a positive integer;

matching the N initial location points with location points on roads comprised in road network information by calling an external road binding service;

obtaining, from the external road binding service, M associated location points on an associated road that matches the N initial location points if the matching is successful, the location points being longitude and latitude point strings;

determining, by using a link information query service, L associated links according to the M associated location points, M and L being positive integers, the links being link strings comprising multiple consecutive longitude and latitude points;

obtaining a location similarity between the N initial location points and the M associated location points; and determining a target navigation route corresponding to the drawn route information according to the L associated links when the location similarity meets a navigation condition; and transmitting the target navigation route to a guidance and route server, the guidance and route server being coupled to the user client and configured to provide navigation guidance to the user client based on the electronic map and the target navigation route.

* * * * *